(12) United States Patent
Cho et al.

(10) Patent No.: US 11,587,265 B2
(45) Date of Patent: Feb. 21, 2023

(54) ELECTRONIC APPARATUS AND CONTROL METHOD THEREOF

(71) Applicant: SAMSUNG ELECTRONICS CO., LTD., Suwon-si (KR)

(72) Inventors: Eunbi Cho, Suwon-si (KR); Jiin Kim, Suwon-si (KR); Jaeyun Jeong, Suwon-si (KR); Seunga Lee, Suwon-si (KR); Gipyo Kim, Suwon-si (KR); Seokyeol Kim, Suwon-si (KR); Songhyeon Kim, Suwon-si (KR); Seokwoo Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 16/929,287

(22) Filed: Jul. 15, 2020

(65) Prior Publication Data
US 2021/0035332 A1 Feb. 4, 2021

Related U.S. Application Data

(60) Provisional application No. 62/882,106, filed on Aug. 2, 2019.

(30) Foreign Application Priority Data

Dec. 20, 2019 (KR) .................. 10-2019-0172247

(51) Int. Cl.
*G06T 11/00* (2006.01)
*G06K 9/00* (2022.01)
(Continued)

(52) U.S. Cl.
CPC .............. *G06T 11/00* (2013.01); *G06V 20/10* (2022.01); *H04N 5/23222* (2013.01); *G06F 3/0482* (2013.01); *G06T 2200/24* (2013.01)

(58) Field of Classification Search
CPC .............. G06F 2111/18; G06F 3/0481; G06F 3/04817; G06F 9/4443; G06F 3/04847;
(Continued)

(56) References Cited

U.S. PATENT DOCUMENTS 5,699,444 A * 12/1997 Palm .................... G06V 10/147
348/E13.016
9,581,431 B1 2/2017 Sieracki
(Continued)

FOREIGN PATENT DOCUMENTS

JP 2018032131 A 3/2018
WO 2019046597 A1 3/2019

OTHER PUBLICATIONS

Communication dated Mar. 9, 2021 by the European Patent Office in counterpart European Patent Application No. 20171953.1.
(Continued)

*Primary Examiner* — Todd Buttram
(74) *Attorney, Agent, or Firm* — Sughrue Mion, PLLC

(57) ABSTRACT

An electronic apparatus is provided. The electronic apparatus according to the disclosure may include a memory configured to store instructions, and a processor configured to execute the instructions to control a display to display an image captured via a camera, and a first guideline, recognize an object in the image based on the first guideline, render a virtual object to replace the object, generate an augmented reality image including the virtual object that is located in an area where the object is located in the image; and control the display to display the augmented reality image.

20 Claims, 25 Drawing Sheets

(51) Int. Cl.
*H04N 5/232* (2006.01)
*G06V 20/10* (2022.01)
*G06F 3/0482* (2013.01)

(58) Field of Classification Search
CPC .... G06F 11/3664; G06F 3/012; G06F 3/0304; G06F 3/011–015; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS

| | | | |
|---|---|---|---|
| 9,586,141 B2 | 3/2017 | Hardy et al. | |
| 10,270,642 B2 | 4/2019 | Zhang et al. | |
| 10,735,820 B2 | 8/2020 | Kim et al. | |
| 11,062,139 B2 | 7/2021 | Sheffield | |
| 2012/0075341 A1* | 3/2012 | Sandberg | G06F 3/147 345/633 |
| 2015/0256740 A1 | 9/2015 | Kalama | |
| 2015/0338211 A1* | 11/2015 | Hu | G06V 10/243 348/135 |
| 2016/0275726 A1 | 9/2016 | Mullins | |
| 2017/0168559 A1* | 6/2017 | Jayadevaprakash | G06T 19/006 |
| 2018/0137642 A1 | 5/2018 | Malisiewicz et al. | |
| 2018/0197336 A1* | 7/2018 | Rochford | G06F 3/012 |
| 2019/0197725 A1 | 6/2019 | Dagley et al. | |

OTHER PUBLICATIONS

Jeff K.T. Tang et al. "AR Interior Designer: Automatic Furniture Arrangement using Spatial and Functional Relationships" IEEE, Dec. 9, 2014, (8 pages pp. 345-352).

Waraporn Viyanon et al. "AR Furniture : Integrating Augmented Reality Technology to Enhance Interior Design using Marker and Markerless tracking" Proceedings of the 2nd International Conference on Intelligent Information Processing, Jan. 2017, (7 pages total).

Mark Billinghurst et al. "A Survey of Augmented Reality" Foundation of Trends in Human-Computer Interaction vol. 8, No. 2-3, Jan. 2015, (pp. 73-272).

Sanni Siltanen et al. "Diminished reality for augmented reality interior design" Visual Computer, vol. 33, 2017, (pp. 193-208).

Communication dated Oct. 29, 2020, from the European Patent Office in counterpart European Application No. 20171953.1.

Written Opinion (PCT/ISA/237) issued by the International Searching Authority in corresponding International Application No. PCT/KR2020/005961, dated Aug. 14, 2020.

International Search Report (PCT/ISA/210), issued by International Searching Authority in corresponding International Application No. PCT/KR2020/005961, dated Aug. 14, 2020.

A. Criminisi et al., "Object Removal by Exemplar-Based Inpainting", 2003 IEEE Computer Society Conference, Jun. 18-20, 2003, pp. 1-8.

\* cited by examiner

ELECTRONIC APPARATUS AND CONTROL METHOD THEREOF

CROSS-REFERENCE TO RELATED APPLICATION(S)

This application is based on and claims priority under 35 U.S.C. § 119 to U.S. Provisional Patent Application No. 62/882,106, filed on Aug. 2, 2019, in the U.S. Patent & Trademark Office, and Korean Patent Application No. 10-2019-0172247, filed on Dec. 20, 2019, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus displaying augmented reality images, and a control method thereof.

2. Description of Related Art

Augmented reality is a type of virtual reality which combines the real world seen by a user and a virtual world, and shows the combination as a combined image. Augmented reality, which is a concept of complementing the real word with a virtual world, uses a virtual environment generated by computer graphics, but is based on the real environment. Here, computer graphics perform the role of additionally providing images or information to augment the real environment. That is, computer graphics overlap a three-dimensional virtual image with an actual image that a user is viewing, and thereby make reduce a distinction between the real environment and the virtual screen.

In this regard, a technology of rendering a virtual object in an empty space of an actual image by using an augmented reality technology is being generalized. In a case in which an object exists in an actual image, a complex operation and an apparatus with a high technical specification are required for rendering a virtual object in the place wherein the object is located. Also, a problem exists, which is that the size of a space wherein an object is located cannot be precisely identified according to the photographing angle, the photographing location, etc. even though a complex operation was performed.

SUMMARY

Additional aspects will be set forth in part in the description which follows and, in part, will be apparent from the description, or may be learned by practice of the presented embodiments.

According to an aspect of the disclosure, an electronic apparatus may include a display, a memory configured to store instructions, and a processor configured to execute the instructions to control a display to display an image captured via a camera, and a first guideline, recognize an object in the image based on the first guideline, render a virtual object to replace the object, generate an augmented reality image including the virtual object that is located in an area where the object is located in the image; and control the display to display the augmented reality image.

Based on an event, the processor may render the virtual object to indicate a movement of the virtual object.

The processor may identify a length of a blank space existing in an adjacent area of the object, identify whether the virtual object is capable of being located in the area where the object is located based on length information of the object and the length of the blank space, and based on the virtual object being capable of being located in the area where the object is located, render the virtual object.

The processor may identify whether the virtual object is capable of covering an object area of the object in the image, and generate the augmented reality image by replacing a partial object area of the object that is not covered by the virtual object with a background area adjacent to the partial object area.

The processor may control the display to display a plurality of virtual objects that are capable of replacing the object, and based on a user input selecting one of the plurality of virtual objects being received, render the virtual object corresponding to the user input.

Based on a line being input in association with a surface of the object in the image, the processor may determine a location of the virtual object in the augmented reality image based on the input line.

The processor may identify a location of the virtual object in the augmented reality image based on location information and angle information of the camera, and generate the augmented reality image by arranging the virtual object in the location.

The processor may generate a second guideline for guiding a capturing angle of the camera, and change a length of the second guideline according to the capturing angle of the camera.

Based on receiving a user input that moves the virtual object included in the augmented reality image, the processor may change a location of the virtual object based on the user input and render the virtual object according to the changed location.

Based on location information or angle information of the camera being changed while the augmented reality image is displayed, the processor may change the virtual object based on the location information or angle information of the camera.

According to an aspect of the disclosure, a control method of an electronic apparatus may include capturing an image; displaying a first guideline and the image; recognizing an object in the image based on the first guideline; rendering a virtual object to replace the object; generating an augmented reality image including the virtual object that is located in an area where the object is located in the image; and displaying the augmented reality image.

Based on an event, the control method may further include rendering the virtual object to indicate a movement of the virtual object.

The rendering a virtual object may include identify a length of a blank space existing in an adjacent area of the object, identifying whether the virtual object is capable of being located in the area where the object is located based on length information of the object and the length of the blank space, and based on the virtual object being capable of being located in the area where the object is located, rendering the virtual object.

The generating an augmented reality image may include identifying whether the virtual object is capable of covering an object area of the object in the image, and generating the augmented reality image by replacing a partial object area of the object that is not covered by the virtual object with a background area adjacent to the partial object area.

The control method may further include displaying a plurality of virtual objects that are capable of replacing the object, and based on a user input selecting one of the plurality of virtual objects being received, rendering the virtual object corresponding to the user input.

Based on a line being input in association with a surface of the object in the image, the control method may further include determining a location of the virtual object in the augmented reality image based on the input line.

The control method may further include identifying a location of the virtual object in the augmented reality image based on location information and angle information of a camera, and generating the augmented reality image by arranging the virtual object in the location.

The control method may further include generating a second guideline for guiding a capturing angle of a camera, and changing a length of the second guideline according to the capturing angle of the camera.

The control method may further include receiving a user input that moves the virtual object included in the augmented reality image, and changing a location of the virtual object based on the user input and rendering the virtual object according to the changed location.

According to an aspect of the disclosure, a non-transitory computer-readable medium may store instructions that, when executed by a processor of an apparatus, cause the processor to control a display of the apparatus to display an image captured via a camera of the apparatus, control the display to display a guideline in the image, recognize the object in the image based on the first guideline being aligned with the object, generate an augmented reality image including a virtual object having a location that corresponds to a location of the object in the image, and control the display to display the augmented reality image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
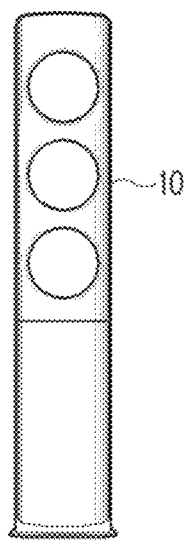
FIG. 1 is a diagram for schematically illustrating an electronic apparatus according to an embodiment.
Figure 1:
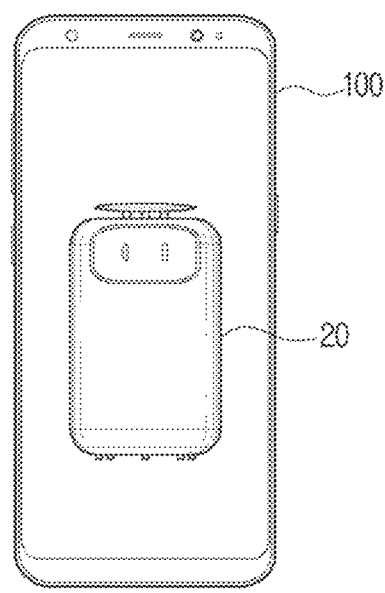

The example embodiments of the disclosure provide an electronic apparatus which improves convenience and accuracy of manipulation by providing a guide to a user, reduces operation complexity, and thereby provides an augmented reality image with a low specification, and a control method thereof.

Hereinafter, various embodiments of the disclosure will be described with reference to the accompanying drawings. However, it should be noted that the various embodiments are not for limiting the technology described in the disclosure to a specific embodiment, but they should be interpreted to include various modifications, equivalents, and/or alternatives of the embodiments of the disclosure. Also, with respect to the detailed description of the drawings, similar components may be designated by similar reference numerals.

In the disclosure, expressions such as "have," "may have," "include," and "may include" should be construed as denoting that there are such characteristics (e.g., elements such as numerical values, functions, operations, and components), and the expressions are not intended to exclude the existence of additional characteristics.

Also, in the disclosure, the expressions "A or B," "at least one of A and/or B," or "one or more of A and/or B," and the like, may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second," and the like, used in the disclosure may be used to describe various elements regardless of any order and/or degree of importance. Also, such expressions are used to distinguish one element from another element, and are not intended to limit the elements.

Further, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," and the like. The term "configured to" may not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

In the disclosure, the term "user" may refer to a person who uses an electronic apparatus or an apparatus using an electronic apparatus (e.g., an artificial intelligence electronic apparatus).

Also, the term "subject" used in the disclosure may mean an object which is the subject of photographing. That is, the term may mean an object which is in a state of being photographed by a camera and not displayed on a display. Also, the term "object" may mean an object included in a photographed image. That is, the term may mean a state wherein a subject photographed by a camera is displayed on a display. Also, the term "virtual object" may mean an object that does not actually exist, but is generated as if it exists in a photographed image.

Hereinafter, the disclosure will be described in detail with reference to the drawings.

FIG. 1 is a diagram for schematically illustrating an electronic apparatus according to an embodiment.

The electronic apparatus 100 may photograph a space around a user through a camera. In this case, the electronic apparatus 100 provides an image corresponding to the space around the user to the user.

The electronic apparatus 100 may replace an object 10 included in the photographed image with a virtual object 20 and generate an augmented reality image. Here, the object corresponds to an object that actually exists in a space around the user, and the virtual object 20 corresponds to a virtual object that does not exist in a space around the user. For example, in case in which an air conditioner 10 is included in an image photographed by the electronic apparatus 100, the electronic apparatus 100 may replace the air conditioner 10 included in the photographed image with a virtual air purifier 20 that does not exist in a space around the user, generate an augmented reality image, and provide the generated augmented reality image to the user.

In FIG. 1, a smartphone is illustrated as the electronic apparatus 100, but the electronic apparatus 100 is not necessarily limited thereto. In the disclosure, the electronic apparatus 100 may be implemented as an apparatus equipped with a display function such as a television (TV), a tablet personal computer (PC), a portable media player (PMP), a personal digital assistance (PDA), a laptop, a smart watch, a head mounted display (HMD), and a near eye display (NED). Also, the electronic apparatus 100 may include various forms of displays 120 to provide a display function.

The example embodiments of the disclosure may also be implemented through an electronic apparatus that is not equipped with a display function. For example, various types of electronic apparatuses providing an image to an external apparatus such as a Blu-ray player, a digital versatile disc (DVD) player, a streaming content output apparatus, and a set-top box may implement the various embodiments of the disclosure. As another example, various forms of home appliances such as a speaker, a refrigerator, a washing machine, an air conditioner, an air purifier, and various kinds of Internet of Things apparatuses may implement the various embodiments of the disclosure. Hereinafter, for convenience of explanation, explanation will be made based on the assumption that the electronic apparatus 100 is a user terminal apparatus equipped with a camera 110 and a display 120.

Figure 2:
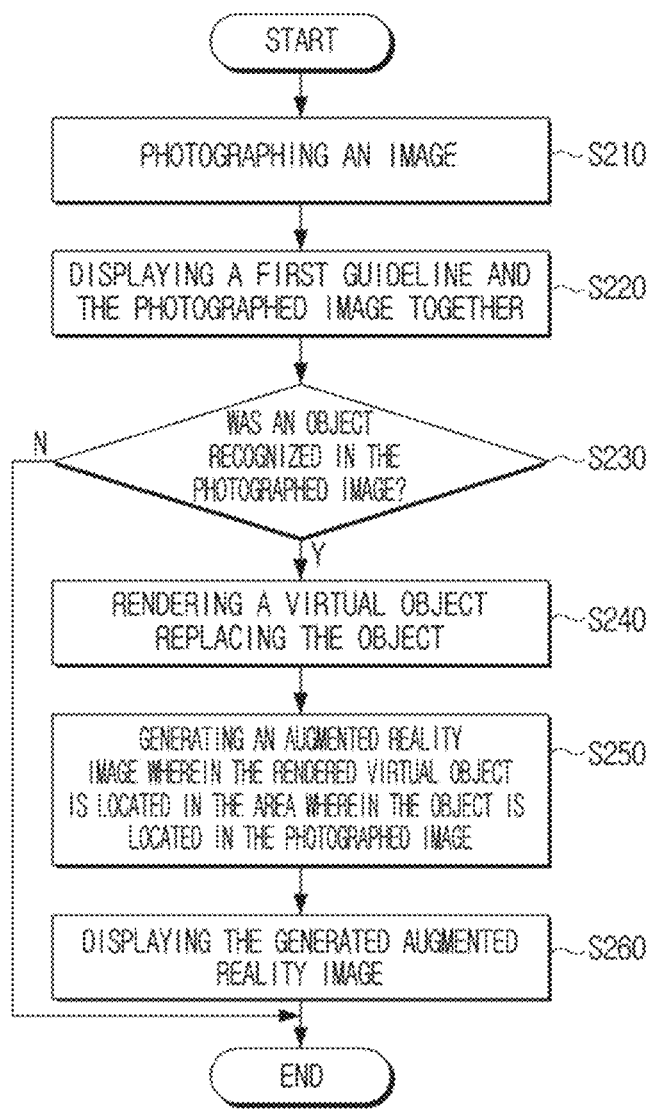
FIG. 2 is a flow chart for illustrating a control method of an electronic apparatus according to an embodiment.

FIG. 2 is a flow chart for illustrating a control method of an electronic apparatus according to an embodiment.

First, in the control method of an electronic apparatus according to an embodiment of the disclosure, an image is photographed at operation S210. Here, the electronic apparatus 100 may photograph an area opposing the electronic apparatus 100 via a camera arranged on the rear surface of the electronic apparatus 100.

Then, a first guideline and the photographed image are displayed together at operation S220. Specifically, the electronic apparatus 100 may provide a guide such that the corner of a photographed object is placed on the first guideline by using the first guideline, and thereby induce a user to photograph a subject based on the first guideline when photographing a subject. Alternatively, the electronic apparatus 100 may provide a guide such that an object is photographed while the corner of the photographed object is in parallel to the first guideline. As a user may easily photograph a subject in an accurate angle and an accurate direction by using the first guideline, and the electronic apparatus 100 photographs an object while one surface of the object is in line with the first guideline, a process of an operation applying an augmented reality (AR) technology may be simplified. A method of simplifying a process of an operation will be described in detail later with reference to FIG. 8.

Here, the first guideline is a line displayed on the display 120, and is a user interface (UI) for specifying the location of an object included in an image. Specifically, the first guideline means a straight line for guiding such that the location of an object included in an image can be the front surface of the object. Also, on the ½ point of the first guideline, a line orthogonal to the first guideline is placed, and the center of the object may be made to coincide with the line orthogonal to the first guideline. That is, the first guideline may be a line for guiding such that the camera is toward the front surface of an object and a vertical center axis of the object can be placed in the center of the display 120. However, this is merely an embodiment, and a location wherein the first guideline is located and whether there is a line orthogonal to the first guideline may vary.

Then, the electronic device 100 determines whether an object was recognized in the photographed image based on the first guideline at operation S230. In this regard, the electronic apparatus 100 may be set such that an object is recognized in the photographed image. Here, an object corresponds to a subject that exists in reality, and if a subject is photographed by a camera, an object may be included in the photographed image. Also, an object is replaced with a virtual object in an augmented reality image, and may be various kinds of home appliances or external electronic apparatuses. For example, an object may be home appliances or external electronic apparatuses such as a TV, a monitor, a washing machine, a refrigerator, and an air conditioner. In case the electronic apparatus 100 photographs an image in real time and displays the image on the display 120, the electronic apparatus 100 may recognize an object existing on the display 120 based on the first guideline. That is, the electronic apparatus 100 may recognize the size of an object or an area wherein an object exists based on the first guideline.

In addition to the first guideline, a second guideline guiding a photographing angle of a camera may be generated. The second guideline indicates a UI for guiding such that a camera photographs an object at an angle parallel to the object. For example, in case a photographing angle of a camera is not perpendicular to the ground surface, i.e., in case a camera does not photograph an object at an angle parallel to the object, the second guideline may be displayed, and in case a camera is at an angle parallel to an object, the second guideline may not be displayed.

Also, according to a photographing angle of a camera, the photographing angle of the camera may be guided by changing the length of the second guideline. For example, the length of the second guideline may be longer in a case wherein a camera faces an object from the upside than in a case wherein a camera faces an object from the downside.

If a subject is photographed while being aligned with the first guideline, and the electronic apparatus 100 recognizes an object in the photographed image based on the first guideline at operation S230-Y, the electronic apparatus 100 may render a virtual object replacing the object at operation S240. Here, a virtual object may be an object of the same kind as the recognized object, but is not necessarily limited thereto. That is, a virtual object may be various kinds of home appliances or external electronic apparatuses. Also, a virtual object may be a still object, or a moving object.

In addition, a virtual object may be an object selected by a user. Specifically, if an object is recognized, a list including a plurality of virtual objects that can replace the recognized object may be displayed, and if a user input selecting one of the plurality of virtual objects is received, a virtual object corresponding to the user input may be rendered.

The control method of the disclosure may render a virtual object in consideration of the size of a recognized object and the surrounding blank space of the recognized object. Specifically, the length of a blank space existing in an adjacent area to the recognized object is identified, and it may be identified whether a virtual object can be located in the area wherein the object is located based on the length information of the object and the identified length of the blank space. Then, if it is identified that a virtual object can be located in the area wherein the object is located, a virtual object may be rendered.

Then, the electronic apparatus 100 may generate an augmented reality image wherein a rendered virtual object is located in an area wherein an object is located in the photographed image at operation S250.

Specifically, based on the location information and the angle information of a camera photographing an image, the location of a virtual object in an augmented reality image may be identified, and an augmented reality image wherein a virtual object is arranged in the identified location may be generated.

To be more specific, based on the location information and the angle information of a camera, a movement value and a rotation value of a recognized object may be identified, and based on the movement value and the rotation value of the object, the size of a virtual object may be calculated and the location of the virtual object may be identified.

It may be identified whether a rendered virtual object can cover an object area inside an image. Here, the feature that a rendered virtual object can cover an object area means that a rendered virtual object is overlapped with an object in an image, and a portion of the object is not shown.

In a case in which a partial area of an object not covered by a virtual object exists, the partial object area not covered by the virtual object may be replaced with the background area around the partial object area and an augmented reality image may be generated.

Then, the electronic apparatus 100 may display the generated augmented reality image at operation S260.

After the generated augmented reality image is displayed, if an event occurs, a virtual object indicating a movement during a driving operation of a virtual object may be rendered. Here, an event may mean an operation of touching or dragging the rendered virtual object. For example, in case a user touches a virtual object (e.g., a refrigerator) in the generated augmented reality image for a predetermined time period (e.g., two seconds), a virtual object indicating a movement during a driving operation of the virtual object (e.g., opening of the door of the refrigerator) may be rendered.

A user input moving a virtual object included in an augmented reality image may be received. In this case, the virtual object may be rendered while the location of the virtual object in the photographed image is changed based on the user input. For example, in case a virtual object corresponding to a dryer was rendered beside a washing machine, but a user input moving the virtual object onto the washing machine was received, the virtual object corresponding to the dryer may be rendered to be located on the washing machine.

If the location information of the camera is changed while an augmented reality image including a virtual object is displayed, the virtual object may be rendered while being changed based on the changed location of the camera. For example, in case the location of the camera moves to the left and right sides of an object while an augmented reality image including a virtual object is displayed, the virtual object displayed on the image may be rendered while being changed to a virtual object corresponding to a left side surface or a right side surface of the virtual object.

Then, an augmented reality image including the rendered virtual object may be displayed.

Figure 3:
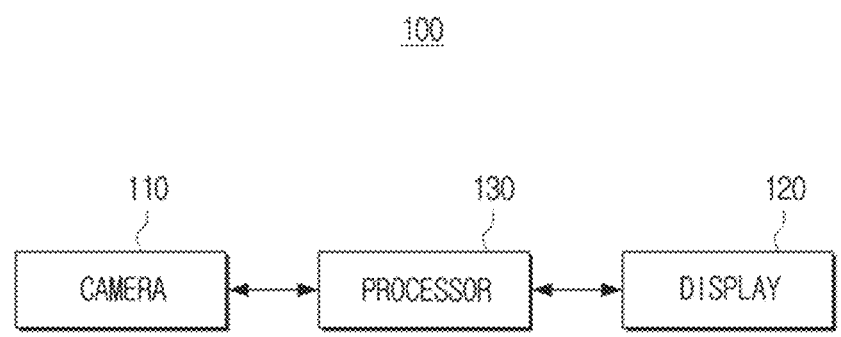
FIG. 3 is a block diagram for illustrating a configuration of an electronic apparatus according to an embodiment.

FIG. 3 is a block diagram for illustrating a configuration of an electronic apparatus according to an embodiment of the disclosure.

Referring to FIG. 3, the electronic apparatus 100 includes a camera 110, a display 120, and a processor 130. However, the electronic apparatus 100 might not necessarily include a camera 110, a display 120, and a processor 130, and depending on various embodiments, some components among the camera 110, the display 120, and the processor 130 may be omitted.

The camera 110 is an apparatus that may photograph a still image or a moving image, and may include at least one image sensor (e.g., a front surface sensor or a rear surface sensor), a lens, an image signal processor (ISP), and a flash component (e.g., a light emitting diode (LED), a xenon lamp, etc.).

The camera 110 may be located on the front surface or the rear surface of the electronic apparatus 100. In the disclosure, explanation will be made based on the assumption that an image is photographed with a camera placed on the rear surface of the electronic apparatus 100, but the disclosure is not necessarily limited thereto, and an image may be photographed with a camera placed on the front surface of the electronic apparatus 100.

The camera 110 according to an embodiment may photograph a random subject according to control of the processor 130, and transmit the photographed data to the processor 130. The photographed data may be stored in the memory 150 according to control of the processor 130. Here, the photographed data may referred to as a picture, an image, a still image, and a moving image, but hereinafter, the data will be generally referred to as an image for the convenience of explanation. Here, a subject may mean an object which is the subject of photographing. An image according to the various embodiments of the disclosure may mean an image received from an external apparatus or an external server, or an image stored in the memory 150, etc., other than a live view image photographed through the camera 110.

According to an embodiment, the processor 130 may display an augmented reality screen through the display 120 based on an image photographed through the camera 110.

The display 120 may provide various content screens that can be provided through the electronic apparatus 100. Here, a content screen may include various content such as an image, a moving image, texts, music, an application execution screen, a graphic user interface (GUI) screen, etc.

The display 120 may be implemented as various forms of displays such as a liquid crystal display (LCD), an organic light emitting diodes (OLED) display, a plasma display panel (PDP), a wall, and a micro LED. In the display 120, a driving circuit that may be implemented in forms such as an amorphous silicon (A-Si) thin-film transistor TFT, a low temperature poly silicon (LTPS) TFT, and an organic TFT (OTFT), a backlight unit, etc. may also be included together. The display 120 may be implemented as a touch screen combined with a touch sensor, a flexible display, a 3D display, etc.

Also, the display 120 according to an embodiment may include a display panel configured to output an image, and a bezel housing a display panel. In particular, a bezel according to an embodiment may include a touch sensor (not shown) for detecting a user interaction.

In particular, the display 120 may display an image photographed in real time through the camera 110 according to control of the processor 130 (e.g., a live view image), an augmented reality (AR) image to which a virtual object is added to the image, or an image acquired by the processor 130 based on the image, etc., as will be described below. Here, a virtual object may be referred to as an AR object, a virtual object image, etc., but hereinafter, it will be generally referred to as a virtual object for the convenience of explanation.

The processor 130 may be electronically connected with the memory 150, and control the overall operations and functions of the electronic apparatus 100. For example, the processor 130 may drive an operating system or an application program, control hardware or software components connected to the processor 130, and perform various kinds of data processing and operations. Also, the processor 130 may load an instruction or data received from at least one of other components on a volatile memory and process it, and store various kinds of data in a non-volatile memory.

The processor 130 may be implemented as a dedicated processor (e.g., an embedded processor) for performing the corresponding operation or a generic-purpose processor (e.g., a central processing unit (CPU) or an application processor) that may perform the corresponding operations by executing one or more software programs stored in a memory device.

In the disclosure, the processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA).

The processor 130 may recognize an object in an image photographed through a camera. Here, an object may indicate specific home appliances such as a TV, a monitor, a washing machine, a refrigerator, and an air conditioner, and such information on a recognizable object may be stored in the memory 150 in advance. An object may mean an object located on the display 120 in a specific state. Specifically, the processor 130 may recognize a photographed object such that one surface of the object coincides or is in parallel with the first guideline based on the first guideline displayed on the display 120.

The processor 130 may generate a user interface (UI) for guiding such that a photographed object is located on a line displayed on the display 120 or one surface of an object is in parallel with a line displayed on the display 120, and control the display 120 to display this. Detailed explanation in this regard will be made with reference to FIGS. 4A, 4B, 4C, 5A, and 5B.

Figure 4A:
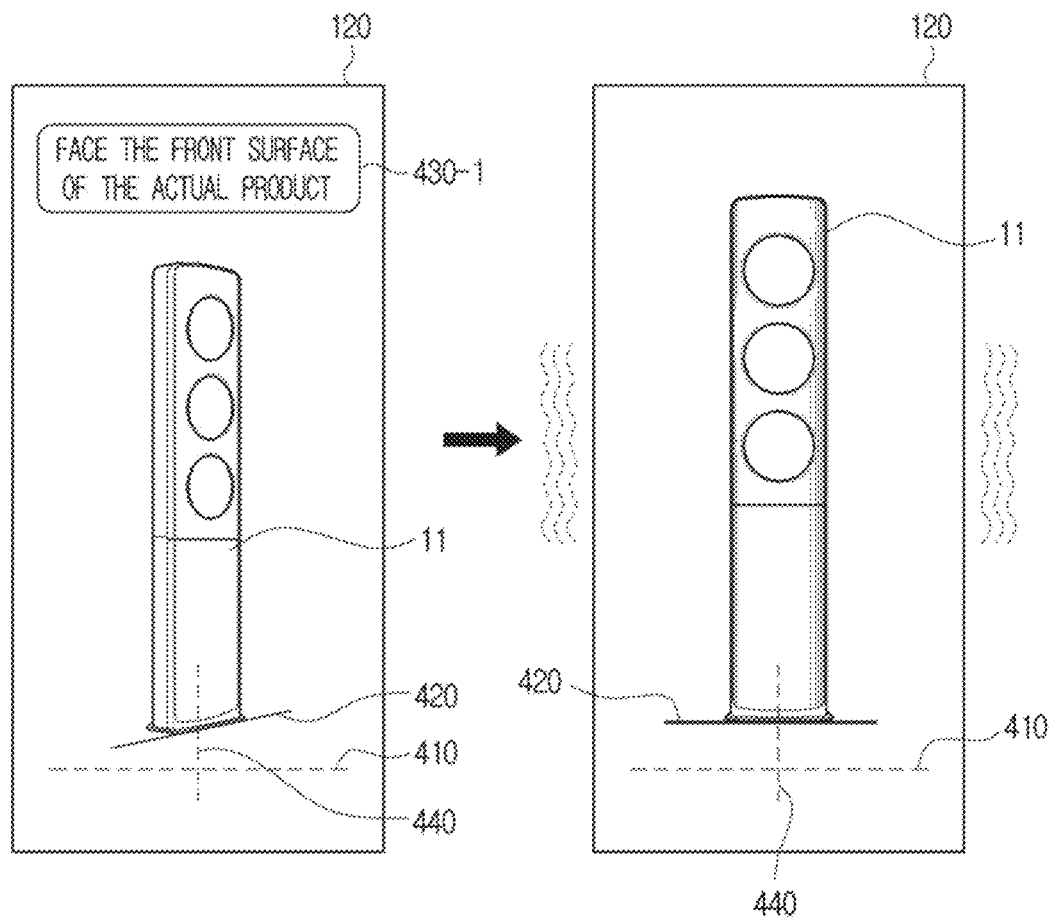
FIG. 4A is a diagram for illustrating an electronic apparatus indicating a guideline according to an embodiment.
Figure 4B:
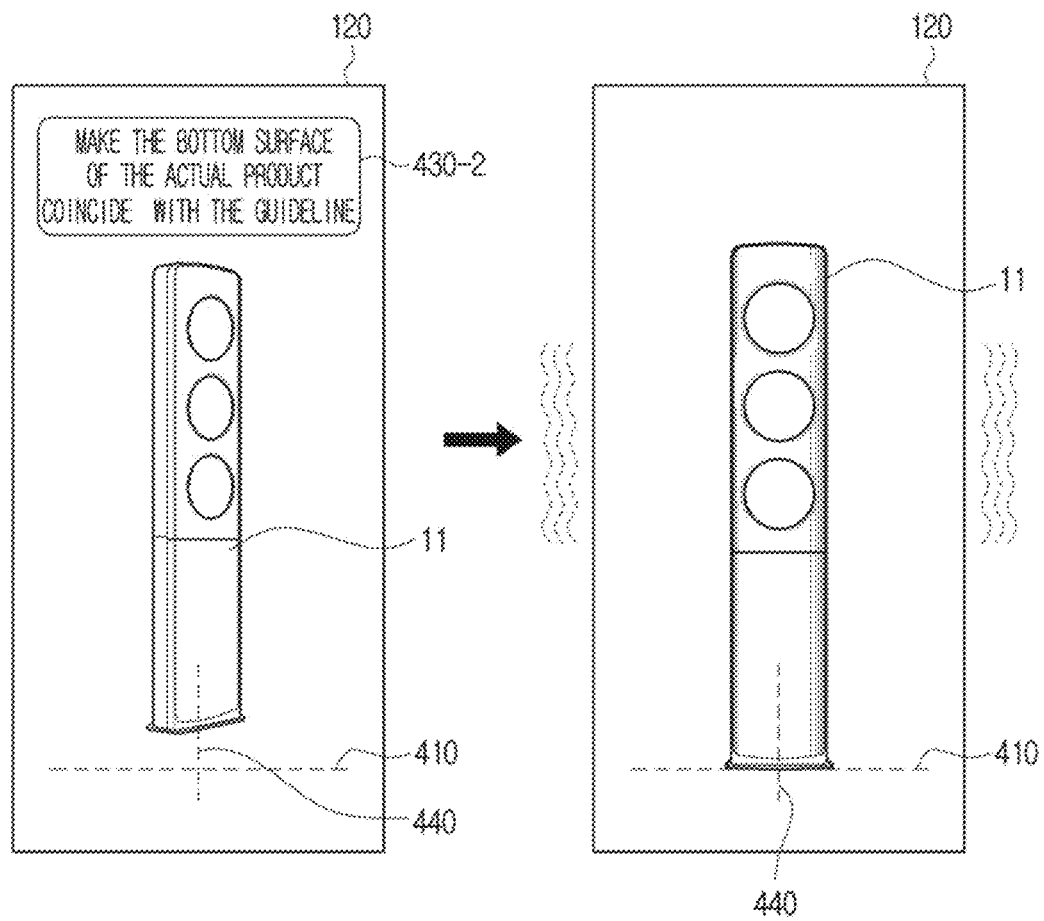
FIG. 4B is a diagram for illustrating an electronic apparatus indicating a guideline according to an embodiment.
Figure 4C:
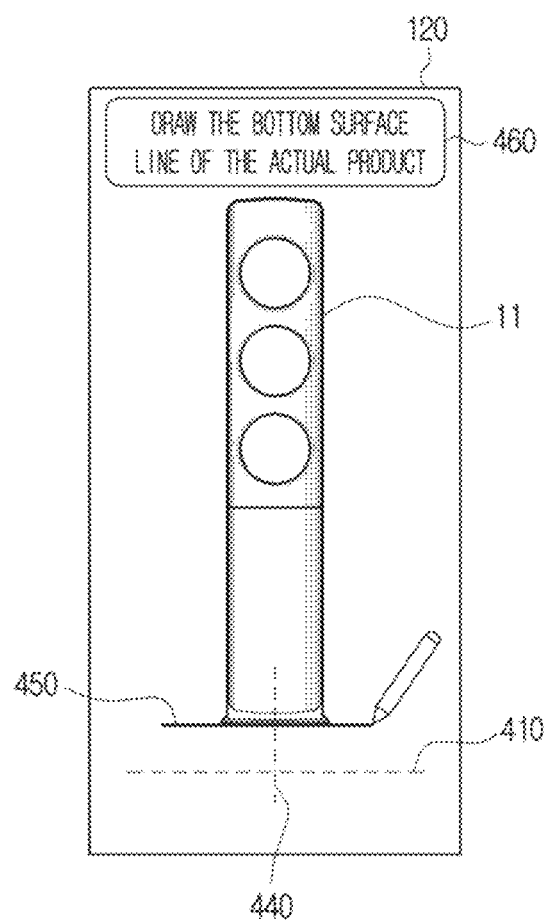
FIG. 4C is a diagram for illustrating an electronic apparatus indicating a guideline according to an embodiment.

Referring to FIGS. 4A, 4B, and 4C, the processor 130 may guide the location of an object in an image by using the first guideline 410.

As described above with reference to FIG. 2, the first guideline 410 is a line displayed on the display, and it may be a UI for guiding the location of an object 11 included in an image. That is, the first guideline 410 indicates a straight line for guiding so that the entire front surface of the object 11 can be displayed in an image. For example, the first guideline may be located on the ⅓ point of the display 120 from the lower end of the display 120. That is, as the first guideline is located on the ⅓ point from the lower end of the display 120, an object included in an image may be guided to be located in the center of the display 120. A location wherein the first guideline is displayed is not necessarily limited thereto, and the location may vary.

Also, according to an embodiment, for performing recognition of an object or extracting an object from a background, the electronic apparatus 100 may perform object recognition and extraction by using a relatively more simple mathematical formula and a relatively more simple algorithm based on the first guideline 410, without using software technologies with high complexity such as deep learning and computer vision. Also, by using the first guideline 410, the electronic apparatus 100 may perform object recognition and object extraction without using depth data of a space and a camera with a high performance generating depth data.

The processor 130 may generate the first guideline 410 for guiding such that one surface of an object 11 included in a photographed image coincides or is in parallel with a line displayed on the screen of the display 120, and control the display 120 to display the generated first guideline 410 on the screen of the display 120. For example, the processor 130 may provide a guide such that a corner corresponding to the front surface of the object 11 among a plurality of corners included in the bottom surface of the photographed object 11 is placed on the first guideline 410. Specifically, the processor 130 may control the display 120 to display a straight line 420, which is a straight line extended from a corner corresponding to the front surface of the photographed object 11. Then, the processor 130 may provide a guide such that the object is photographed while the straight line 420 and the first guide line 410 coincide or are in parallel.

As illustrated in FIG. 4A, in case the straight line 420 and the first guideline 410 are not parallel, the processor 130 may provide a guide such that the straight line 420 is parallel with the first guideline 410, i.e., the camera 110 is moved so that the camera 110 may face the front surface of a subject 10 corresponding to an object. Specifically, the processor 130 may control the display 120 to display a message 430-1 such as "Face the front surface of the actual product," provide a guide such that the user adjusts the location of the camera 110, and provide a guide such that a corner corresponding to the front surface among the corners included in the bottom surface of the object 11 is in parallel with the first guideline 410 in accordance thereto. The electronic apparatus 100 may guide such that the user can photograph the subject 10 by an accurate method by using the first guideline 410 and the message 430-1. Then, in case the straight line 420 extended from the corner corresponding to the front surface of the object 11 is in parallel with the first guideline, the processor 130 may provide feedback informing the user that the location of the object 11 is located in a location parallel with the first guideline 410. Here, the feedback may be provided in various forms such as indication of a message informing the location of the object 11, vibration of the electronic apparatus 100, flickering of the screen, the color of the object 11, and change of the thickness of the shade. FIG. 4A illustrates a drawing wherein, in a case in which the straight line 420 extended from the corner corresponding to the front surface of the object 11 is parallel with the first guideline, feedback is provided to the user by using vibration.

As illustrated in FIG. 4B, the straight line 420 extended from the corner corresponding to the front surface of the object 11 may be omitted on the display 120. Also, in a case in which the bottom surface of the object 11 does not coincide with the first guideline 410, the processor 130 may provide a guide such that the bottom surface of the object 11 coincides with the first guideline 410, i.e., the camera 110 is moved so that the camera 110 can face the front surface of a subject 10 corresponding to the object. Specifically, the processor 130 may control the display 120 to display a message 430-2 such as "Make the bottom surface of the actual product coincide with the guideline," provide a guide such that the user adjusts the location of the camera 110, and provide a guide such that a corner corresponding to the front surface among the corners included in the bottom surface of the object 11 coincides with the first guideline 410 in accordance thereto. The electronic apparatus 100 may provide a guide such that the user can photograph the subject 10 by an accurate method by using the first guideline 410 and the message 430-2. Then, in case the corner corresponding to the front surface among the corners included in the bottom surface of the object 11 coincides with the first guideline 410, the processor 130 may provide feedback informing the user that the location of the object 11 is located on the first guideline 410. Here, the feedback may be provided in various forms such as an indication of a message informing the location of the object 11, vibration of the electronic apparatus, flickering of the screen, and change of the color, the shade, and the thickness of the object 11. FIG. 4B illustrates a drawing wherein, in a case in which the corner corresponding to the front surface among the corners included in the bottom surface of the object 11 coincides with the first guideline, a feedback is provided to the user by using vibration.

The processor 130 may guide such that a straight line 440 orthogonal to the first guideline is placed on the ½ point of the first guideline 410, and the center axis of the object included in the image coincides with the straight line 440.

Also, in case the center axis of the object 11 coincides with or is adjacent to the straight line 440, the processor 130 may provide feedback informing that the center axis of the object 11 coincides with or is adjacent to the straight line 440 to the user. The feedback in this case may also be provided in various forms such as indication of a message informing the location of the object 11, vibration of the electronic apparatus, flickering of the screen, and change of the color, the shade, and the thickness of the object 11.

As described above, the processor 130 may provide the first guideline, and provide a guide such that the camera 110 is located on the front surface of the subject 10 corresponding to the object 11 replaced with the virtual object 20.

Explanation with reference to FIG. 4A was made based on an embodiment wherein the first guideline 410 and the straight line 420 are parallel, but the explanation may also be applied to a case wherein the first guideline 410 and the straight line 420 coincide. Likewise, explanation with reference to FIG. 4B was made based on an embodiment wherein the first guideline 410 and the bottom surface of the object 11 coincide, but the explanation may be applied to a case wherein the first guideline 410 and the bottom surface of the object 11 are parallel.

As illustrated in FIG. 4C, the processor 130 may guide such that the user draws a corner corresponding to the front surface among the corners included in the bottom surface of the object 11. Specifically, the processor 130 may provide a UI guiding such that the user draws a corner included in the bottom surface of the object 11. For example, the processor 130 may control the display 120 to display a message 460 such as "Draw the bottom surface line of the actual product," and provide a guide such that the user draws the bottom surface line 450 of the object 11. Then, the processor 130 may receive input of the bottom surface line 450 of the object 11 from the user, and identify the input bottom surface line 450. Then, the processor 130 may control the display 120 to display a virtual object based on the identified bottom surface line 450. Specifically, the processor 130 may recognize the object 11 based on the bottom surface line 450. That is, the input bottom surface line 450 may be a basis for recognizing the object 11 as an alternative to the first guideline 410. As the bottom surface line 450 may perform the role of the first guideline 410 described above with reference to FIGS. 4A and 4B, in this case, the processor 130 may include the first guideline 410 and the straight line 440, or the first guideline 410 and the straight line 440 may be omitted. FIG. 4C illustrates a drawing including the first guideline 410 and the straight line 440.

Then, the processor 130 may recognize the object 11 based on the bottom surface line 450, and the processor 130 may calculate information related to the rotation angle and information related to the location of the recognized object 11, and render a virtual object replacing the object 11.

The user may easily follow the guide with input of the bottom surface line 450, without having to control the angle of the camera 110 such that the corner corresponding to the front surface among the corners included in the bottom surface of the object 11 is in parallel or coincides with the first guideline 410. For the convenience of explanation, FIG. 4C illustrates a drawing wherein the front surface of the object 11 is photographed parallel to the first guideline 410, and the user inputs the bottom surface line 450 into the front surface of the photographed object 11. However, it is obvious that, in case the front surface of the object 11 is not photographed to be in parallel or coincide with the first guideline 410, the photographed object 11 can be recognized with input of the bottom surface line 450.

The processor 130 may guide the location of the camera, and the angle of the camera.

Figure 5A:
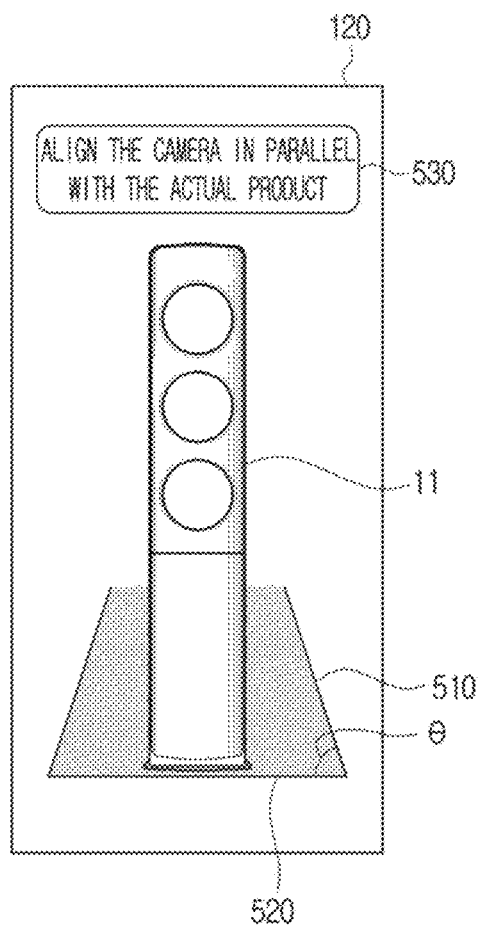
FIG. 5A is a diagram for illustrating an electronic apparatus indicating a guideline according to an embodiment.
Figure 5B:
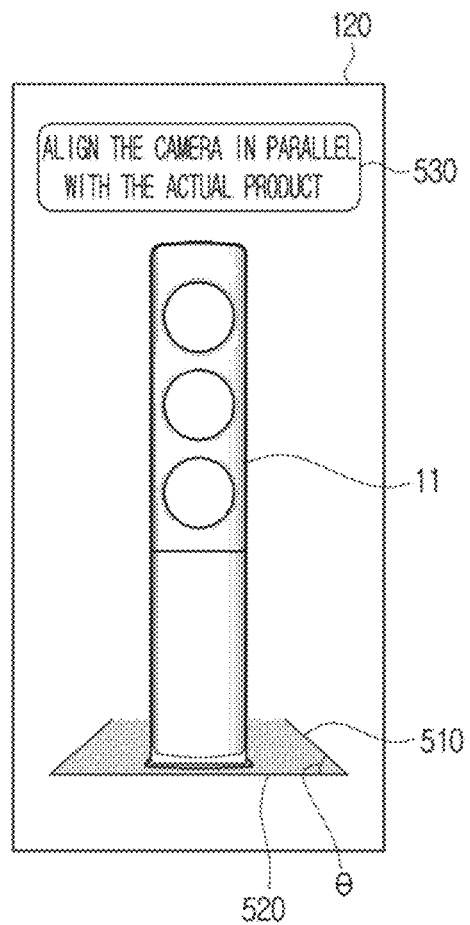
FIG. 5B is a diagram for illustrating an electronic apparatus indicating a guideline according to an embodiment.

FIGS. 5A and 5B are diagrams for illustrating a second guideline guiding an angle of a camera according to an embodiment.

The processor 130 may acquire the pose information of a camera including the rotation information of the camera by using a simultaneous localization and mapping (SLAM) algorithm, and identify the photographing angle of the camera 110 based on the acquired pose information of the camera. Detailed explanation in this regard will be made with reference to FIG. 8.

Also, the processor 130 may generate a second guideline for guiding the photographing angle of the camera 110 based on the identified photographing angle of the camera 110, and change the length of the second guideline according to the photographing angle of the camera 110.

In addition, the processor 130 may provide a guide such that the angle of the camera 110 located on the front surface of a subject 10 is adjusted by using the generated second guideline. Specifically, the processor 130 may change the length of the second guideline according to the photographing angle of the camera 110, and thereby guide such that the camera 110 photographs the subject 10 at an angle parallel to the subject 10.

FIG. 5A is a diagram illustrating the object 11 and the second guideline 510 displayed on the display 120 in case the camera 110 photographed the subject 10 at an angle facing the ground surface, i.e., at an angle facing the lower end of the subject 10. In FIGS. 5A and 5B, the line 520 may correspond to the first guideline 410 described above with reference to FIGS. 4A, 4B, and 4C. Here, the line 520 may include the straight line 440 in FIG. 4A, and the straight line 440 may be omitted depending on cases. FIGS. 5A and 5B illustrate drawings wherein the straight line 440 in FIG. 4A is omitted.

As illustrated in FIG. 5A, in case the camera 110 photographed the subject 10 at an angle facing the ground surface, the processor 130 may control the display 120 to display the second guideline 510 based on the angle of the camera 110.

The processor 130 may change the length of the second guideline 510 such that the length of the second guideline 510 becomes longer as the photographing angle of the camera 110 becomes larger, i.e., the more the camera 110 faces the ground surface. In contrast, the processor 130 may change the length of the second guideline 510 such that the length of the second guideline 510 becomes shorter as the photographing angle of the camera 110 becomes smaller, i.e., the more the camera is located in parallel with the subject 10.

FIG. 5B is a diagram illustrating the object 11 and the second guideline 510 displayed on the display 120 in case the camera 110 photographed the subject 10 at an angle facing the ceiling, i.e., at an angle facing the upper end of the subject 10.

The processor 130 may change the length of the second guideline 510 such that the length of the second guideline 510 becomes longer as the photographing angle of the camera 110 becomes bigger, i.e., the more the camera 110 faces the ceiling. In contrast, the processor 130 may change the length of the second guideline 510 such that the length of the second guideline 510 becomes shorter as the photographing angle of the camera 110 becomes smaller, i.e., the more the camera is located in parallel with the subject 10.

The processor 130 may respectively vary the angles that the second guideline 510 constitutes with the line 520, for distinguishing a case wherein the camera 110 faces the ground surface and a case wherein the camera 110 faces the ceiling. For example, in case the camera 110 faces the ground surface, the processor 130 may set the angle that the second guideline 510 constitutes with the line 520 as a first angle (e.g., 60 degrees), and in case the camera 110 faces the ceiling, the processor 130 may set the angle that the second guideline 510 constitutes with the line 520 as a second angle (e.g., 30 degrees).

In case the camera 110 is located at an angle parallel to the subject 10, the processor 130 may provide feedback informing that the angle of the camera 110 is in parallel with the subject 10. The feedback in this case may be provided in various forms such as indication of a message informing the angle of the camera 110, vibration of the electronic apparatus, flickering of the screen, and change of the color, the shade, and the thickness of the object 11 displayed on the screen.

The processor 130 may use various UIs in addition to the second guideline and the line 520 for guiding the photographing angle of the camera. For example, the processor 130 may display the angle of the camera, or display a message indicating the angle of the camera in one area of a photographed image. Alternatively, the processor 130 may display a message 530 which is "Align the camera in parallel with the actual product" until the angle of the camera 110 is located at an angle parallel to the subject 10.

Returning to FIG. 3, in case an object included in a photographed image is located on the first guideline displayed on the display 120, or an image is photographed with the angle of the camera 110 in parallel with the subject 10, the processor 130 may recognize an object included in the photographed image.

Then, the processor 130 may render a virtual object 20 replacing the recognized object. Here, the virtual object 20 may correspond to various kinds of external electronic apparatuses or home appliances. The virtual object 20 may be an object corresponding to the recognized object, but is not necessarily limited thereto. That is, in case a recognized object is an air conditioner, the virtual object 20 may be an air conditioner of a different kind from the recognized object, but it may also be an electronic apparatus such as a refrigerator and an air purifier which are not air conditioners.

Based on an object being recognized, the processor 130 may provide various virtual objects that may replace the recognized object, and render a virtual object selected according to a user input selecting one among the virtual objects.

Figure 6A:
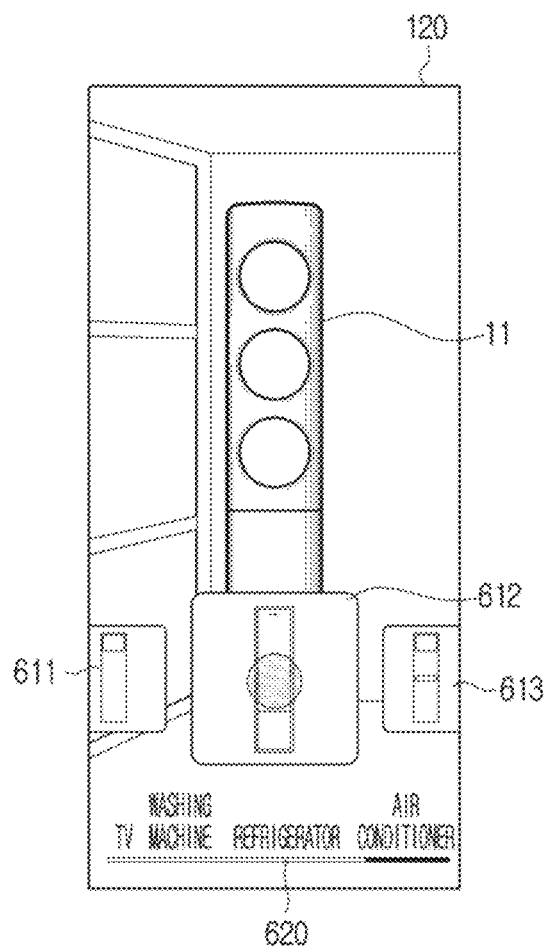
FIG. 6A is a diagram for illustrating an electronic apparatus indicating a plurality of virtual objects according to an embodiment.
Figure 6B:
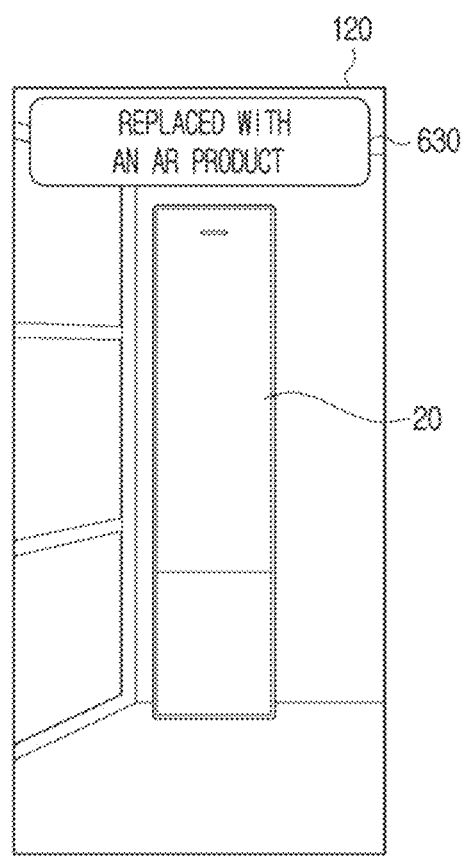
FIG. 6B is a diagram for illustrating an electronic apparatus indicating a plurality of virtual objects according to an embodiment.

In this regard, FIGS. 6A and 6B are diagrams for illustrating an electronic apparatus providing various virtual objects according to an embodiment.

As illustrated in FIG. 6A, based on an object 11 being recognized in a photographed image, the processor 130 may control the display 120 to display a plurality of virtual objects 611, 612, and 613 that may replace the recognized object 11. Here, the plurality of virtual objects may include the images of the virtual objects that can replace the recognized object, and information related to the virtual objects such as the serial numbers, the colors, and the release years of the virtual objects.

The processor 130 may control the display 120 to display various virtual objects according to a user interaction touching or dragging the plurality of virtual objects 611, 612, 613. For example, while the virtual object 612 is displayed in the center, and the virtual object 611 and the virtual object 613 are displayed on the left and right sides of the virtual object 612, based on a user input passing the virtual object 612 to the right being received, the processor 130 may cause the virtual object 611 to be displayed in the center of the screen. Also, on the left side of the virtual object 611, a new virtual object (not shown) may be displayed.

The processor 130 may display a list 620 related to the plurality of virtual objects in addition to the plurality of virtual objects 611, 612, and 613. Also, based on a user input selecting one of a plurality of list information (e.g., a TV, a washing machine, a refrigerator, etc.) included in the list 620 being received, the processor 130 may render a plurality of virtual objects corresponding to the user input. For example, based on a user input selecting a refrigerator among the plurality of list information included in the list 620 being received, the processor 130 may render a plurality of virtual objects corresponding to the refrigerator.

Based on a user input selecting one of the plurality of virtual objects 611, 612, and 613 being received, the processor 130 may render a virtual object corresponding to the user input. For example, based in the user selecting the virtual object 612 among the plurality of virtual objects 611, 612, and 613, as illustrated in FIG. 6B, the processor 130 may render the selected virtual object 612, and control the display 120 to display a virtual object 20 corresponding to the selected virtual object 612 in the location wherein the object 11 is located in the photographed image. That is, the processor 130 may control the display 120 to display an augmented reality image replacing the object 11 with the virtual object 20.

Then, the processor 130 may inform the user that the object 11 was replaced with the virtual object 20 in the augmented reality image. Specifically, the processor 130 may control the display 120 to display a message 630 such as "Replaced with an AR product," and thereby inform that the object 11 was replaced with the virtual object 20 in the augmented reality image.

The processor 130 may render the virtual object in consideration of the surrounding space of the recognized object.

In this regard, FIGS. 7A, 7B, 7C and 7D are diagrams for illustrating an electronic apparatus rendering a virtual object in consideration of the surrounding space of a recognized object according to an embodiment of the disclosure.

Figure 7A:
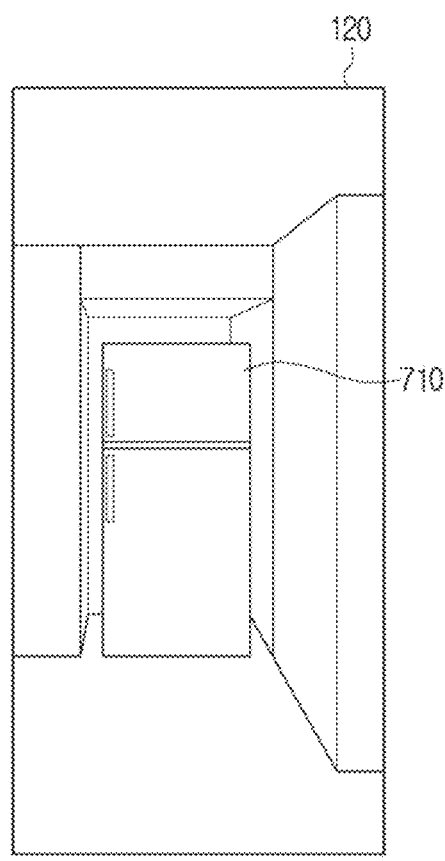
FIG. 7A is a diagram for illustrating an electronic apparatus determining a blank space and rendering a virtual object according to an embodiment.

Referring to FIG. 7A, a drawing wherein a recognized object 710 and a blank space 70 existing in the surroundings are displayed on the display 120 is illustrated.

The processor 130 may identify a blank space 70 existing in the surroundings of the recognized object 710. Here, the blank space 70 means a space wherein no object or matter exists among the surrounding spaces of the recognized object.

Figure 7B:
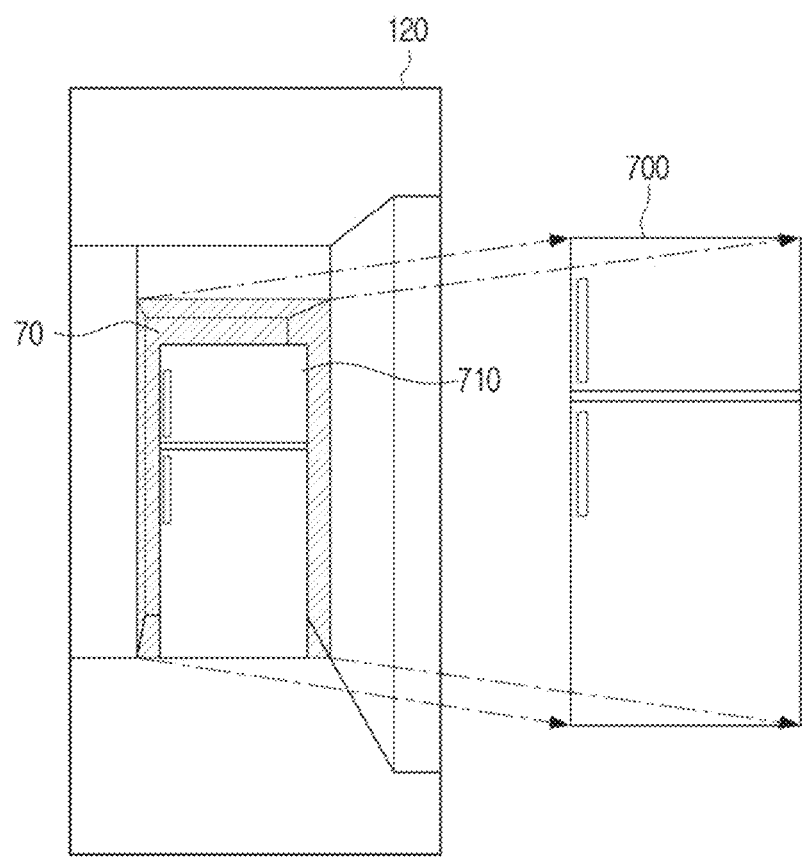
FIG. 7B is a diagram for illustrating an electronic apparatus determining a blank space and rendering a virtual object according to an embodiment.

Referring to FIG. 7B, the processor 130 may recognize an object 710 in a photographed image and recognize a blank space 70 existing in the surroundings of the object 710, and identify the length of the blank space 70. Specifically, the processor 130 may identify the length of the blank space 70 identified to exist in an adjacent area of the object 710 in the photographed image by using a simultaneous localization and mapping (SLAM) algorithm. Also, the processor 130 may identify the length information of the recognized object 710 included in the photographed image by using the SLAM algorithm. Then, the processor 130 may identify whether the virtual object 700 can be located in the area wherein the recognized object 710 is located based on the identified length information of the object 710 and length information of the blank space 70.

The processor 130 may acquire the length information of the actual electronic apparatus corresponding to the virtual object 700. Specifically, the processor 130 may acquire the length information of the actual electronic apparatus corresponding to the virtual object 700 from an external apparatus such as a server (not shown). Alternatively, the processor 130 may store, in advance, the length information of the actual electronic apparatus corresponding to the virtual object 700 together with the virtual object 700.

Figure 7C:
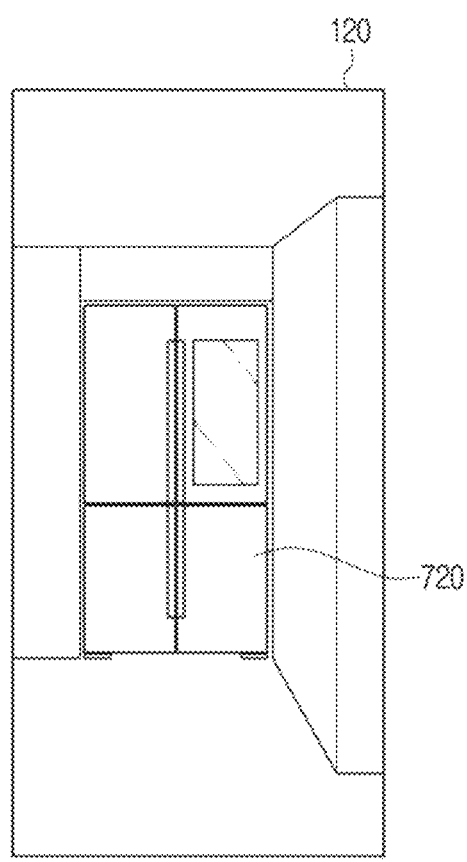
FIG. 7C is a diagram for illustrating an electronic apparatus determining a blank space and rendering a virtual object according to an embodiment.

As a result of determining the length information of the object 710, the length information of the blank space 70, and the length information of the virtual object 700, if it is identified that the virtual object 700 can be located in the area wherein the object 710 is located, then the processor 130 may render the first virtual object 720 in the area wherein the object 710 is located as illustrated in FIG. 7C.

Alternatively, as a result of determining the length information of the object 710, the length information of the blank space 70, and the length information of the virtual object 700, if it is identified that the virtual object 700 cannot be located in the area wherein the object 710 is located, the processor 130 may inform that an actual product corresponding to the virtual object 700 cannot be arranged.

Specifically, the processor 130 may compare the length information of the actual electronic apparatus corresponding to the second virtual object 730 with the length information of the object 710 and the length information of the blank space 70. If the length information of the actual electronic apparatus corresponding to the second virtual object 730 is bigger than the numerical value summing up the length information of the object 710 and the length information of the blank space 70, the processor 130 may identify that a product corresponding to the second virtual object 730 cannot be arranged in the area wherein the object 710 is located.

Figure 7D:
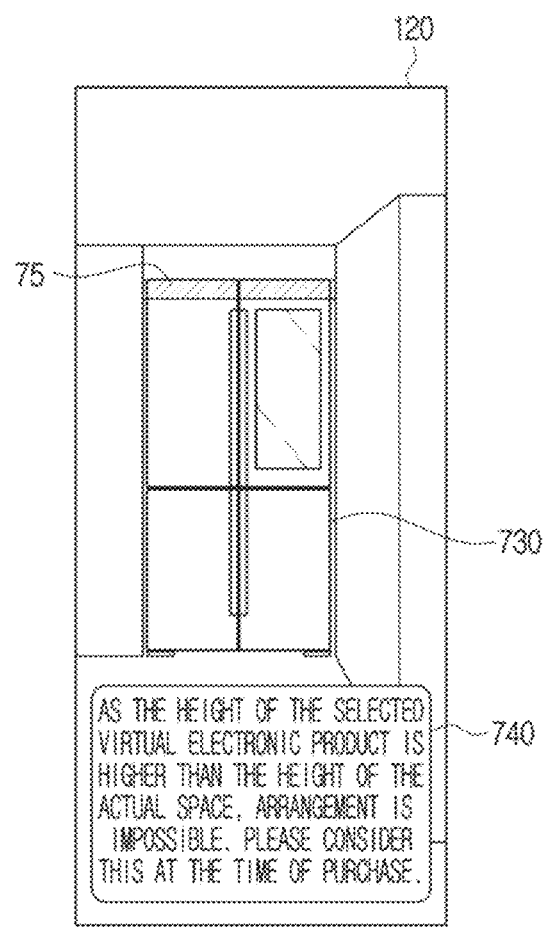
FIG. 7D is a diagram for illustrating an electronic apparatus determining a blank space and rendering a virtual object according to an embodiment.

Referring to FIG. 7D, the processor 130 may render the second virtual object 730 instead of the object 710 in the area wherein the object 710 is located, and control the display 120 to display an area 75 wherein the actual space and the second virtual object 730 overlap.

Then, the processor 130 may inform that a product corresponding to the second virtual object 730 cannot be arranged in the area wherein the object 710 is located. Specifically, the processor 130 may display a message 740 such as "As the height of the selected virtual electronic product is higher than the height of the actual space, arrangement is impossible. Please consider this at the time of purchase."

Also, the processor 130 may identify the location of the rendered virtual object 700 based on the identified location of the object.

Figure 8A:
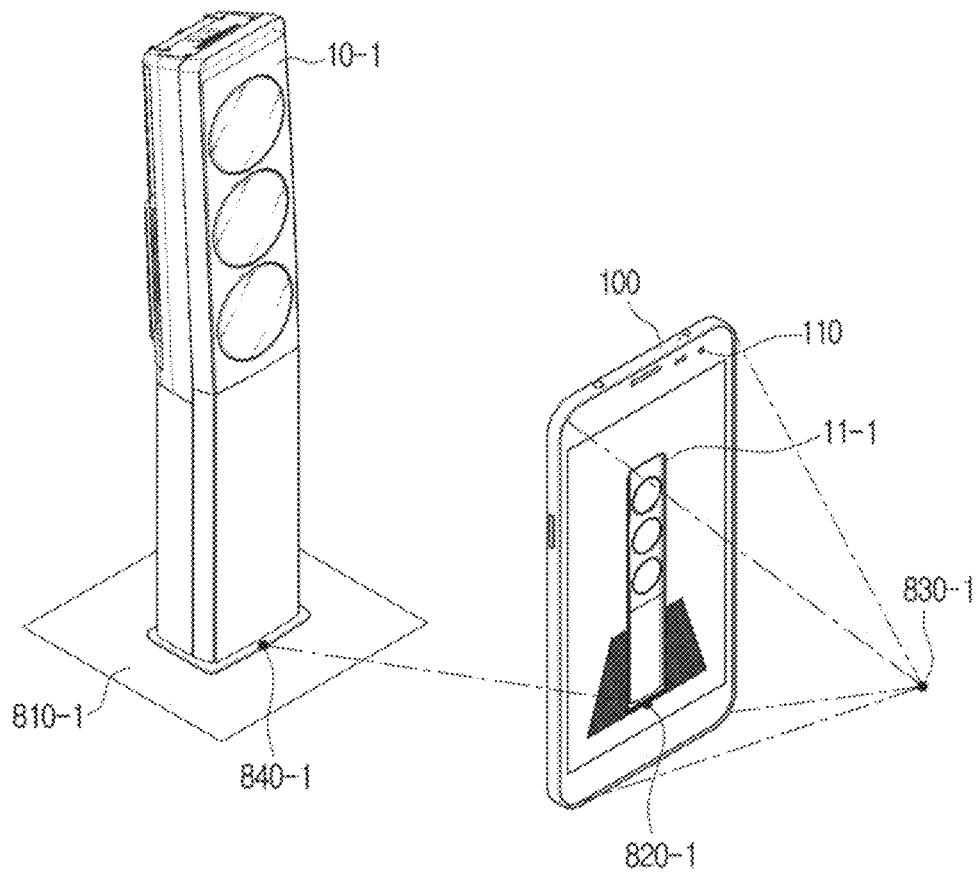
FIG. 8A is a diagram for illustrating a method of determining the location of a virtual object according to an embodiment.
Figure 8B:
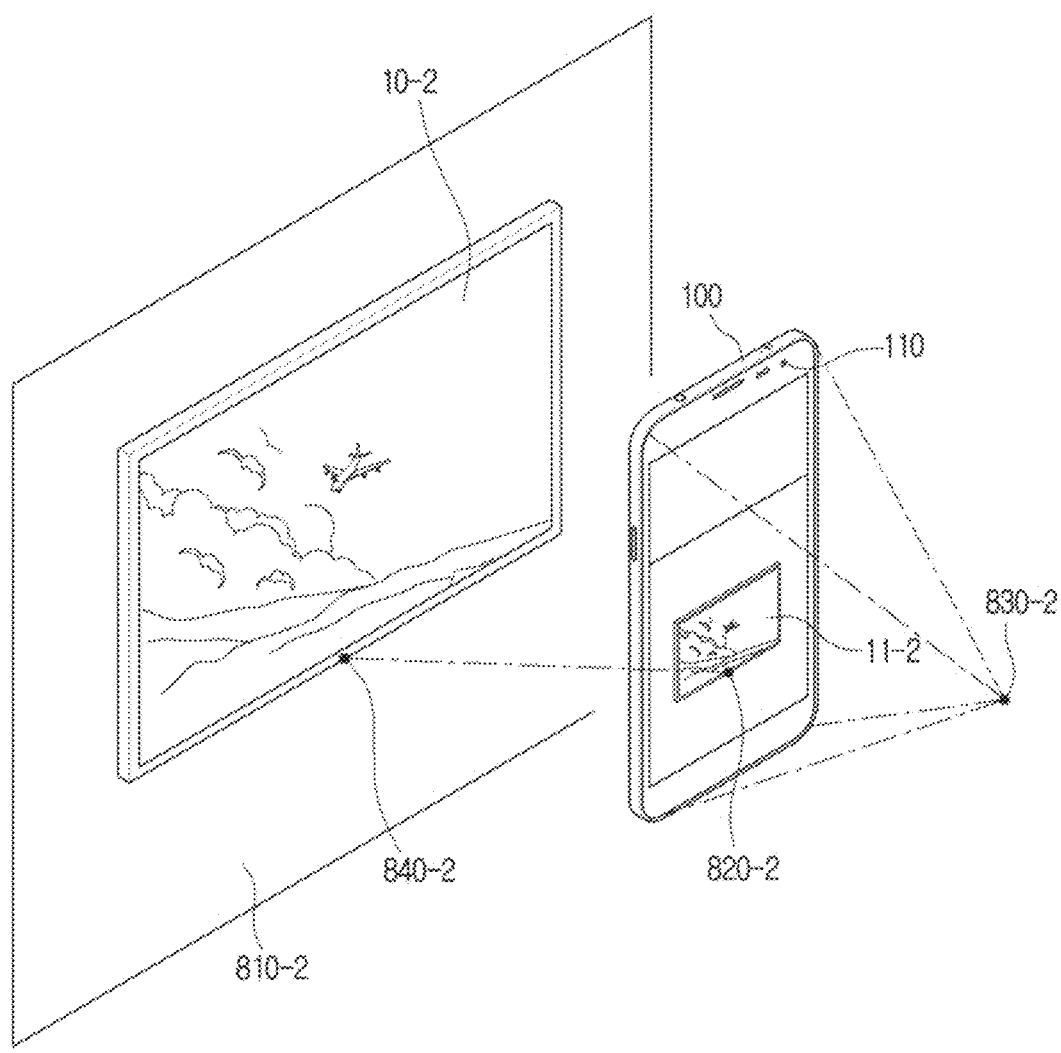
FIG. 8B is a diagram for illustrating a method of determining the location of a virtual object according to an embodiment.

In this regard, FIGS. 8A and 8B are diagrams for illustrating an electronic apparatus determining the location of an object according to an embodiment of the disclosure. With reference to FIGS. 8A and 8B, a method of reducing operation complexity will be explained based on the assumption of a situation wherein a user is guided to photograph a subject 10 by using the first guideline, and the subject 10 photographed on a display screen is indicated as an object 11.

Referring to FIG. 8A, the processor 130 may identify the location of an object 11-1 in an augmented reality image based on the location information and the angle information of the camera 110, and identify the location of a virtual object based on the identified location of the object 11-1. Here, the camera 110 may be an RGB camera that can acquire RGB data or a 3D camera that can acquire depth data. The explanation below will be made based on the assumption of a case of using a 2D camera or an RGB camera that can acquire RGB data.

The processor 130 may acquire the pose information of the camera 110 by using various SLAM techniques such as a feature-based simultaneous localization and mapping (SLAM) technique, a direct SLAM technique, an extended Kalman filter (EKF) SLAM technique, a fast SLAM technique, and a large-scale direct monocular (LSD) SLAM technique. Here, the pose information of the camera may include the translation information (Tcx, Tcy, Tcz) and the rotation information (Rcx, Rcy, Rcz) of the camera. Alternatively, the pose information of the camera may be, for example, the X (horizontality), Y (verticality), and Z (depth) corresponding to the location of the camera and/or a 6 degree of freedom (6 DoF) camera pose including a pitch, a yaw, and a roll corresponding to the orientation of the camera.

The processor 130 may acquire information regarding a plane 810-1 on which the subject 10 is placed. Also, the processor 130 may estimate a plane space in a photographed image. Specifically, the processor 130 may calculate a plane equation by using a 3D point cloud analysis algorithm. For example, the processor 130 may estimate a plane space in a photographed image by using a random sample consensus (RANSAC) technique which is one of 3D SLAM techniques. Here, the RANSAC technique is a method of extracting sample data randomly, and obtaining a model parameter satisfying the extracted sample data.

For example, according to spatial coherency, a plurality of points constituting a plane space may exist while being adjacent to one another. The processor 130 may estimate a plane space in an image section by using random points adjacent to one another. Also, the processor 130 may identify whether the random points adjacent to one another exist on the same plane, and acquire information on the plane space based on the identification result.

For example, the processor 130 may identify whether a specific space in an image section is a plane space by using first to third points adjacent to one another (or, distanced within a threshold value). If the specific space is a plane space according to the identification result, the processor 130 may acquire coefficients A, B, C, and D of a plane equation based on the first to third points. Then, the processor 130 may acquire the plane equation as information on the plane space based on the following formula 1.

$$Ax+By+Cz+D=0 \qquad \text{[Formula 1]}$$

Here, A, B, and C are normal vectors indicating the direction of a plane, and D may be a distance between a plane including the first to third points and the camera 110. However, this is merely an example, and information on a plane space may be in various forms. For example, the processor 130 may analyze an image section based on a machine-learned model acquiring feature information of an image, and acquire information on a plane space according to the analysis result.

The processor 130 may easily calculate the rotation value of the object 11-1 from an image photographed based on the first guideline 410.

Specifically, the processor 130 may calculate the rotation values of the object 11-1 with respect to the x axis and the z axis based on a plane equation calculated based on the above formula 1. For example, the processor 130 may acquire a first plane equation (A1x+B1y+C1z+D1=0) for a plane 810-1 on which a subject 10-1 is placed. Then, as the subject 10-1 is placed on the plane 810-1, the processor 130 may identify that the rotation value Rpx of the object 11-1 for the x axis is A1 which is the coefficient of x in the first plane equation, and identify that the rotation value Rpz of the object 11-1 for the z axis is C1 which is the coefficient of z in the first plane equation.

Also, the processor 130 may identify the rotation value Rpy of the object 11-1 for the y axis based on the angle information Rcx, Rcy, Rcz of the camera 110. Specifically, as the user photographs the subject 10-1 on the front surface, the processor 130 may identify that the rotation value Rpy of the object 11-1 for the y axis is −Rcy.

The electronic apparatus 100 according to the disclosure may easily calculate the rotation value of the object 11 by using an image photographed to be aligned with the first guideline 410.

The processor 130 may identify the coordinate u, v of the crossing point 820-1 of the first guideline 410 and the straight line 440 orthogonal to the first guideline in the image. Here, the identified coordinate u, v of the crossing point 820-1 is a coordinate on the first guideline 410, and may be fixed on a specific location of the display screen. Accordingly, the processor 130 may identify the identified coordinate u, v of the crossing point 820-1.

The processor 130 may acquire information on a straight line passing through a virtual location 830-1 and the crossing point 820-1 corresponding to the location and angle information of the camera by using the location and angle information of the camera acquired through the identified coordinate u, v of the crossing point 820-1, the intrinsic parameter K of the camera, and the SLAM algorithm. Here, the virtual location 830-1 may mean a coordinate on an actual space corresponding to the location information of the camera. Specifically, the virtual location 830-1 may be a point existing on a straight line connecting one point on the subject 10-1 and one point on the object 11-1 corresponding to the point, and the virtual location 830-1 may mean a location calculated based on the focal length, the focal direction, the photographing angle, the angle information Rcx, Rcy, Rcz, the distance to the subject, etc. of the camera 110.

Specifically, the processor 130 may acquire an equation regarding a straight line passing through the virtual location 830-1 and the crossing point 820-1 as information regarding a straight line by using the following formula 2.

$$sK^{-1}\begin{bmatrix}u\\v\\1\end{bmatrix} - T^c = R^c \begin{bmatrix}X_w\\Y_w\\Z_w\end{bmatrix}$$ [Formula 2]

Then, based on the equation regarding the plane 810-1 and the equation regarding the straight line passing through the virtual location 830-1 and the crossing point 820-1, the processor 130 may calculate the coordinate Tpx, Tpy, Tpz of the crossing point 840-1 of the straight line passing through the virtual location 830-1 and the crossing point 820-1 and the plane 810-1. Here, the coordinate Tpx, Tpy, Tpz of the crossing point 840-1 may indicate the center point of the corner corresponding to the front surface among the corners included in the bottom surface of the recognized object 11-1 in the photographed image. That is, the processor 130 may easily perform the calculation in the above formula 2 by using the first guideline 410 or the coordinate u, v on the first guideline. Then, the processor 130 may alleviate the complexity of the operation obtaining an equation regarding the straight line by making the bottom surface of the subject 10 and the first guideline coincide.

Then, the processor 130 may identify that the subject 10-1 is located on the coordinate Tpx, Tpy, Tpz of the crossing point 840-1. Then, the processor 130 may generate an augmented reality image wherein a virtual object 20 replacing the object 11-1 is arranged in the identified location. Specifically, the processor 130 may render the virtual object 20 such that the center point of the corner corresponding to the front surface among the plurality of corners included in the bottom surface of the virtual object 20 is located on the coordinate Tpx, Tpy, Tpz of the crossing point 840-1.

The processor 130 may calculate the size of the virtual object based on the virtual location 830-1 corresponding to the location information Tcx, Tcy, Tcz of the camera and the coordinate Tpx, Tpy, Tpz of the crossing point 840-1. Specifically, the virtual location 830-1 corresponding to the location information Tcx, Tcy, Tcz of the camera may mean the location of the virtual camera, and thus the processor 130 may identify the size of the virtual object to be inversely proportional to the distance between the virtual location 830-1 corresponding to the location information Tcx, Tcy, Tcz of the camera and the coordinate Tpx, Tpy, Tpz of the crossing point 840-1. For example, if the distance between the virtual location 830-1 and the crossing point 840-1 increases as much as a predetermined distance, the size of the virtual object may be decreased as much as a predetermined size proportion. In a case in which the distance between the virtual location 830-1 and the crossing point 840-1 is 0, the virtual object may be implemented as the actual size of the product corresponding to the virtual object. Then, the processor 130 may render the virtual object in the identified size.

FIG. 8A illustrates the subject 10-1 placed on a floor, but as illustrated in FIG. 8B, the processor 130 may render the virtual object 20 replacing the photographed object 11-2 with respect to the subject 10-2 attached to the wall surface based on the same method.

Specifically, the processor 130 may identify the location of the object 11-2 based on the location information and the angle information of the camera 110, and identify the location of the virtual object based on the identified location of the object 11-2. Also, the processor 130 may acquire pose information of the camera 110 by using various SLAM techniques. That is, the processor 130 may use the same technique or method for identifying the location of the object 11-2.

The processor 130 may calculate the rotation value of the object 11-2 with respect to the X axis and the Y axis based on the plane equation calculated based on the formula 1. For example, the processor 130 may acquire a second plane equation (A2x+B2y+C2z+D2=0) for the plane 810-2 on which the subject 10-2 is located. Also, as the subject 10-2 is located on the plane 810-2, the processor 130 may identify that the rotation value Rpx of the object 11-2 for the X axis is A2 which is the coefficient of x in the second plane equation, and identify that the rotation value Rpy of the object 11-1 for the y axis is B2 which is the coefficient of y in the second plane equation.

Also, the processor 130 may identify the rotation value Rpz of the object 11-2 for the z axis based on the angle information Rcx, Rcy, Rcz of the camera 110. Specifically, as the user photographs the subject 10-2 from the front surface, the processor 130 may identify that the rotation value Rpz of the object 11-2 for the z axis is −Rcz.

The crossing point 820-2, the virtual location 830-2, and the crossing point 840-2 illustrated in FIG. 8B may respectively correspond to the crossing point 820-1, the virtual location 830-1, and the crossing point 840-1 illustrated in FIG. 8A. The processor 130 may identify the coordinate u, v of the crossing point 820-2 by the same method or technique as described with reference to FIG. 8A, and acquire information regarding the straight line passing through the virtual location 830-2 and the crossing point 820-2 corresponding to the location and angle information of the camera by using the location and angle information of the camera acquired through the intrinsic parameter K of the camera and the SLAM algorithm.

The processor 130 may generate an augmented reality image wherein a rendered virtual object is located in an area wherein an object is located in a photographed image, and control the display 120 to display the generated augmented reality image.

As described above, according to an embodiment, the electronic apparatus 100 may identify the location of an object in a photographed image by using only an RGB camera or a 2D camera that can acquire RGB data, without using a camera with a high performance that can acquire depth data. Also, the electronic apparatus 100 may calculate the location, the size, and the rotation value of an object based on the simple formula 1 and formula 2 without using a complex algorithm in object extraction and object recognition processes. Accordingly, the real time quality of an augmented reality image can be improved.

In a case in which a virtual object covers a recognized object in an image, additional image processing might not be necessary. However, in case a virtual object cannot cover a recognized object in an image, additional image processing may be necessary.

Figure 9A:
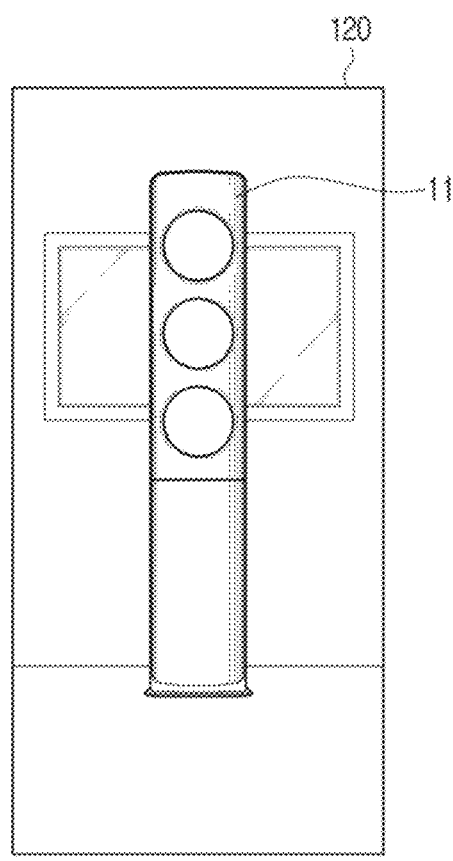
FIG. 9A is a diagram for illustrating an electronic apparatus generating an augmented reality image by using a surrounding background area according to an embodiment.
Figure 9B:
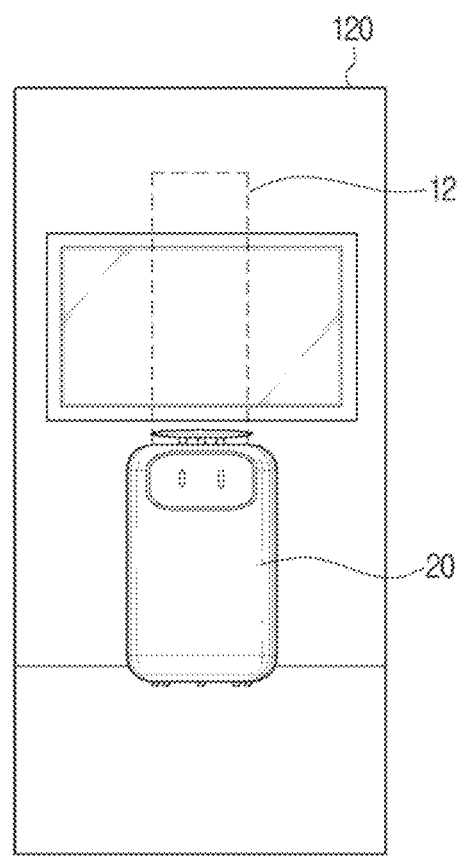
FIG. 9B is a diagram for illustrating an electronic apparatus generating an augmented reality image by using a surrounding background area according to an embodiment.

FIGS. 9A and 9B are diagrams for illustrating an electronic apparatus which performs image processing in case a rendered virtual object cannot cover a recognized object according to an embodiment.

The processor 130 may identify the location and the size of a virtual object as described above with reference to FIG. 8, and identify whether a virtual object rendered in an image can cover an object area in the image. Here, the feature that a rendered virtual object can cover an object area means that a virtual object is totally overlapped with a recognized object, and a portion of the object is not shown in an image.

In case a partial object area not covered by a virtual object exists, the processor 130 may generate an augmented reality image by replacing the partial object area with the background area around the partial object area. Here, the background area around the partial object area means a background area adjacent to the partial area of the object not covered.

Specifically, the processor 130 may remove the partial object area through a vision recognition technology, and replace the removed portion based on the background area adjacent to the removed partial object area.

For example, as illustrated in FIG. 9A, it will be assumed that an object 11 was recognized in an image photographed by the camera 110. Here, the object 11 is an air conditioner, and a background such as a window may exist on the rear side of the object 11. Then, it will be assumed that the processor 130 rendered an air purifier as a virtual object 20 replacing the recognized object 11. In case the air purifier which is the virtual object 20 does not cover the air conditioner which is the object 11 in the photographed image, i.e., in case a partial area of the air conditioner exists in an augmented reality image, the processor 130 may remove the partial area of the air conditioner not covered in the augmented reality image, and replace the removed area based on the window, the wall of the glass window, etc. which are the background area adjacent to the removed partial object area. FIG. 9B illustrates an augmented reality image wherein the processor 130 replaced a removed partial object area 12 based on the window, the wall of the glass window, etc. which are the background area adjacent to the removed partial object area 12.

Figure 10A:
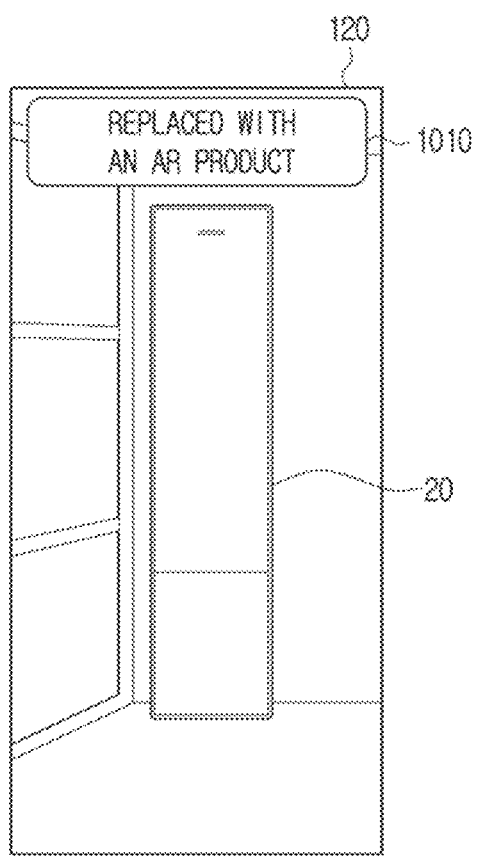
FIG. 10A is a diagram for illustrating an electronic apparatus changing a virtual object according to the location of a camera and rendering the virtual object according to an embodiment.
Figure 10B:
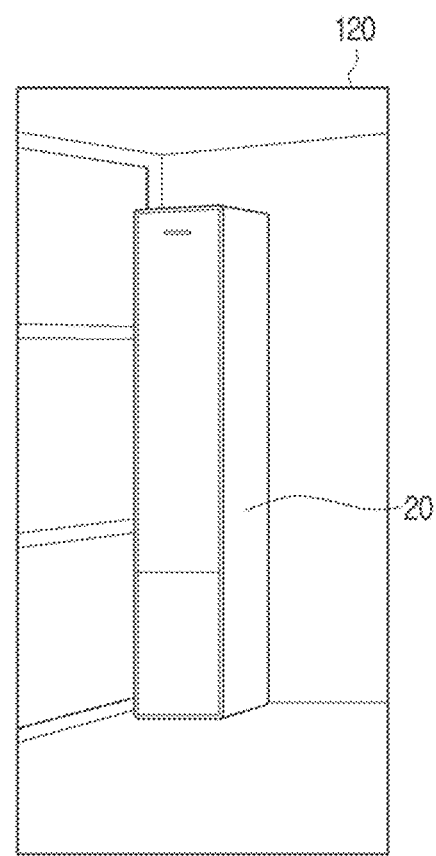
FIG. 10B is a diagram for illustrating an electronic apparatus changing a virtual object according to the location of a camera and rendering the virtual object according to an embodiment.

FIGS. 10A and 10B are diagrams for illustrating an electronic apparatus which changes a virtual object based on the movement of a camera after the virtual object was rendered, and renders the virtual object according to an embodiment of the disclosure.

If the location information or the angle information of the camera 110 is changed while an augmented reality image is displayed, the processor 130 may change a virtual object based on the changed location information or angle information of the camera and render the virtual object.

For this, the processor 130 may acquire information on the view direction (or the view angle) of the camera 110 in the augmented reality image from the camera 110.

Information on the view direction (or the view angle) of the camera 110 according to an embodiment of the disclosure may mean at least one of the direction that the camera 110 faces which corresponds to a real-time image received from the camera 110, the angle of the camera 110, the location of the camera 110, or the posture of the camera 110. For example, information on the view direction of the camera 110 may mean that the camera performed photographing while moving from left to right, or photographed a subject in a specific angle or posture.

According to an embodiment of the disclosure, the electronic apparatus 100 may acquire information on the view direction and view angle of the camera by using at least one of an acceleration sensor or a gyro sensor. For example, the processor 130 may acquire a specific angle (e.g., 15 degrees among 360 degrees in all directions) corresponding to the view direction that the camera 110 faces (or, the direction that the electronic apparatus 100 faces) among all directions (e.g., 360 degrees) as information on the view direction based on a sensing result using at least one of an acceleration sensor or a gyro sensor.

This is merely an example, and the disclosure is not limited thereto. For example, the electronic apparatus 100 can obviously acquire information on the view direction of the camera 110 based on a GPS sensor, a tilt/gravity sensor, a location-based services (LBS) method, location information or direction information received from an external apparatus, a digital compass, etc.

The processor 130 may change a rendered virtual object to a virtual object corresponding to the acquired view direction information. The memory 150 may store a plurality of virtual objects related to a virtual object, and the processor 130 may change the virtual object by using the plurality of virtual objects stored in the memory 150. Here, the plurality of virtual objects related to the virtual object may include images wherein an electronic apparatus corresponding to the virtual object was photographed in various angles and directions. Then, in case the processor 130 identified that the view direction information of the camera 110 was changed, the processor 130 may render the virtual object rendered in an augmented reality image as a virtual object corresponding to the view direction information among the plurality of virtual objects related to the virtual object.

For example, as illustrated in FIG. 10A, it will be assumed that, while the front surface of an air conditioner which is a virtual object 20 was rendered, the camera 110 moved by approximately 30 degrees in a counterclockwise direction based on the subject 10. In this case, the processor 130 may acquire the view direction information of the camera 110, and change the virtual object to a virtual object corresponding to the acquired view direction information (e.g., a virtual object including an image which moved by approximately 30 degrees in a counterclockwise direction from the front surface) and render the virtual object. FIG. 10B illustrates an augmented reality image wherein a virtual object was changed based on the changed view direction information acquired and was rendered.

Figure 11A:
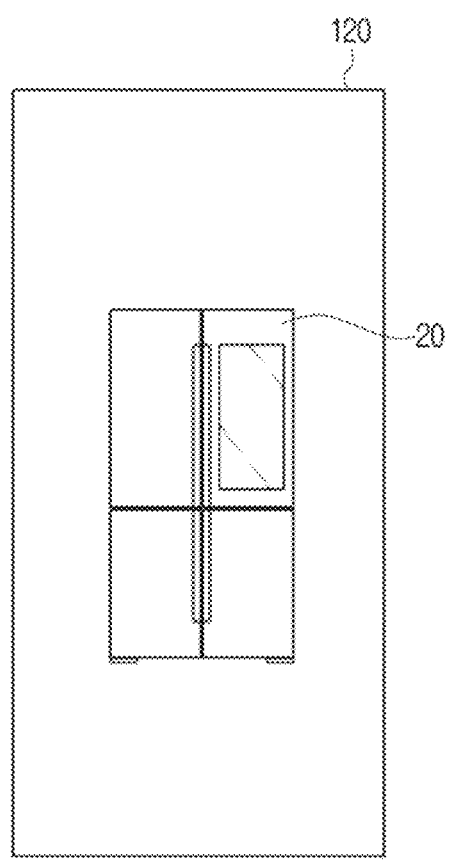
FIG. 11A is a diagram for illustrating an electronic apparatus rendering a virtual object indicating a movement during a driving operation of a virtual object according to an embodiment.
Figure 11B:
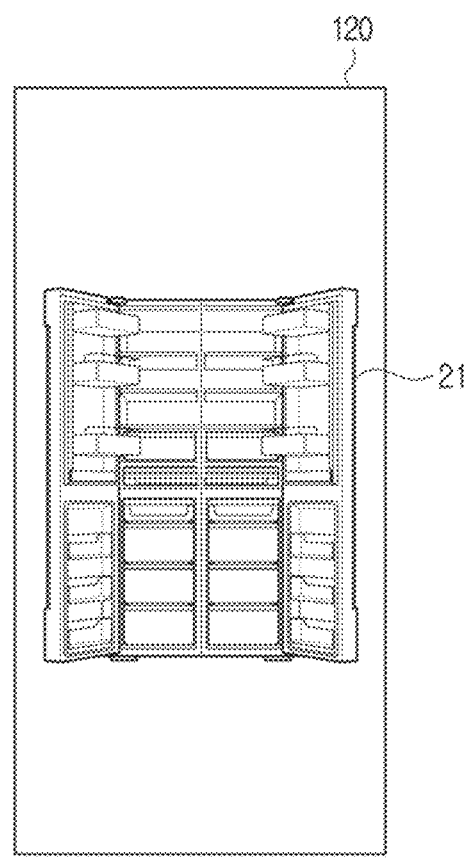
FIG. 11B is a diagram for illustrating an electronic apparatus rendering a virtual object indicating a movement during a driving operation of a virtual object according to an embodiment.

FIGS. 11A and 11B are diagrams for illustrating an electronic apparatus rendering a virtual object according to an embodiment of the disclosure.

When an event occurs, the processor 130 may render a virtual object indicating a movement during a driving operation of a virtual object. Specifically, when an event such as receiving a user input touching a virtual object while a virtual object is rendered in an augmented reality image occurs, the processor 130 may render a virtual object indicating a movement during a driving operation of a virtual object. Here, a movement during a driving operation of a virtual object is an object indicating a driving state of an electronic apparatus corresponding to a virtual object, and may include an object such as the door opening operation of a refrigerator (or a washing machine, a dryer), an image displaying operation of a TV, and a menu displaying operation of a display included in an air conditioner (or a refrigerator).

For example, as illustrated in FIG. 11A, while a refrigerator is illustrated in an augmented reality image as a virtual object 20, if a user input touching the refrigerator displayed on the screen is received, the processor 130 may render a virtual object 21 wherein the door of the refrigerator is opened, as illustrated in FIG. 11B.

For this, the memory 150 may store a virtual object indicating a movement during an operation of a virtual object, and when an event occurs, the processor 130 may render a virtual object indicating a movement during an operation of a rendered virtual object.

In the above, it was described that an event receives a user input touching a virtual object, but the disclosure is not necessarily limited thereto. For example, an event may vary depending on embodiments, such as receiving a voice input of a user, receiving a user input selecting a UI (e.g., a UI indicating viewing of an operation state) displayed in an augmented reality image, and receiving a user input shaking the electronic apparatus 100. Also, it may be possible that a predetermined time period passes after a virtual object was rendered and a virtual object indicating a movement during a driving operation of a virtual object is rendered, without a user input.

Figure 12A:
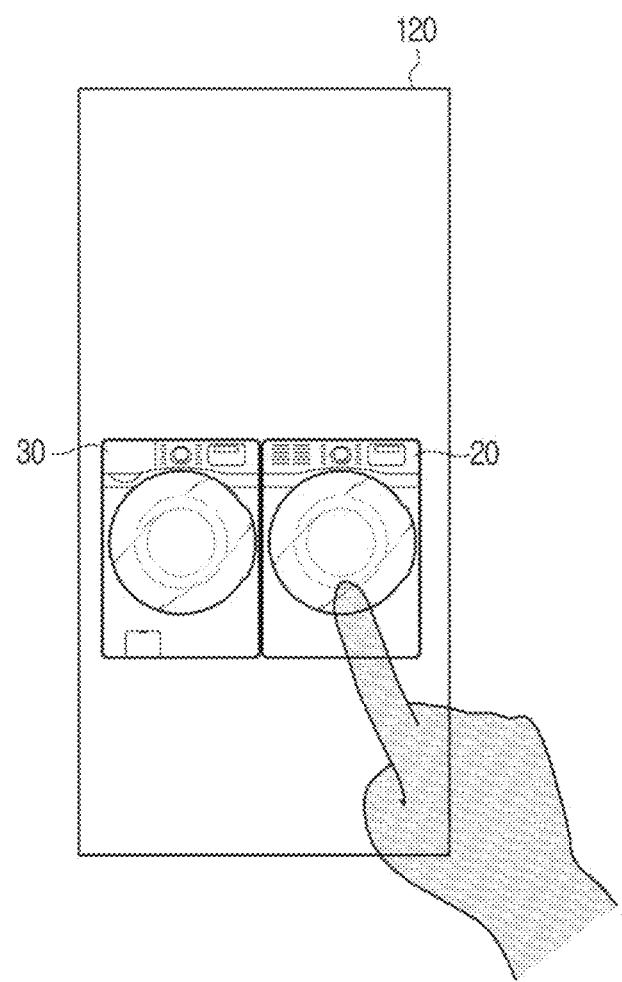
FIG. 12A is a diagram for illustrating an electronic apparatus changing the location of a virtual object according to a user input moving a virtual object included in an augmented reality image and rendering the virtual object according to an embodiment.
Figure 12B:
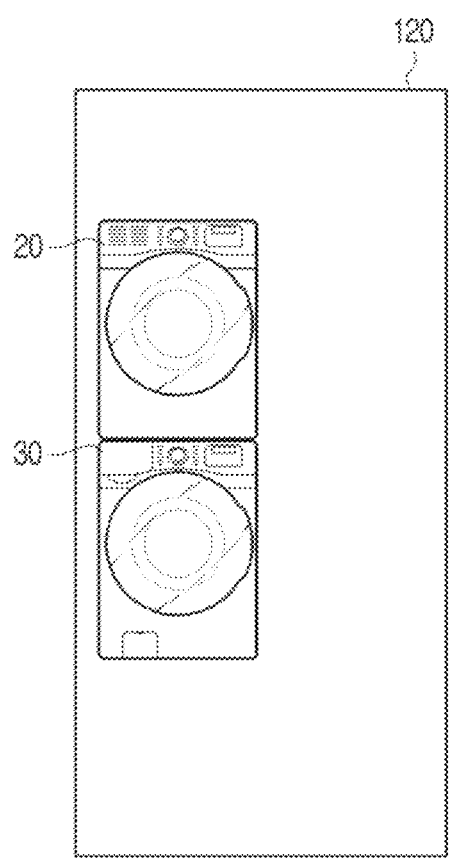
FIG. 12B is a diagram for illustrating an electronic apparatus changing the location of a virtual object according to a user input moving a virtual object included in an augmented reality image and rendering the virtual object according to an embodiment.

FIGS. 12A and 12B are diagrams for illustrating an electronic apparatus changing the location of a rendered virtual object.

When the processor 130 receives a user input moving a virtual object included in an augmented reality image, the processor 130 may change the location of the virtual object based on the user input and render the virtual object.

For example, it will be assumed that the camera 110 photographs areas wherein a washing machine 30 and a dryer exist, and the processor 130 renders a virtual object 20 replacing the photographed dryer, and as illustrated in FIG. 12A, the processor 130 displays an augmented reality image including the washing machine 30 and the virtual object 20 corresponding to a subject existing in reality on the display 120.

Here, if a user input moving the virtual object 20 is received, the processor 130 may change the location of the virtual object 20 based on the user input and render the virtual object 20. For example, if a user input selecting a dryer which is the virtual object 20 and dragging it to the upper end of the washing machine 30 is received, the processor 130 may change the location of the dryer displayed in the augmented reality image to the upper end of the washing machine 30.

Figure 13:
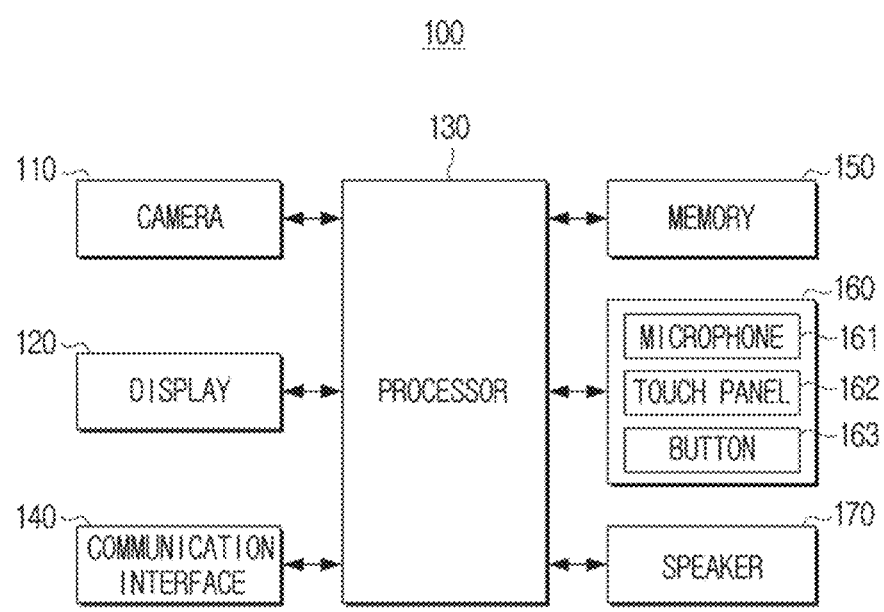
FIG. 13 is a block diagram for illustrating a detailed configuration of an electronic apparatus according to an embodiment.

FIG. 13 is a diagram for illustrating a detailed configuration of an electronic apparatus according to an embodiment of the disclosure.

As illustrated in FIG. 13, the electronic apparatus 100 may include a camera 110, a display 120, a processor 130, a communication interface 140, a memory 150, an input interface 160, and a speaker 170. Among the components illustrated in FIG. 13, regarding the components overlapping with the components illustrated in FIG. 2, detailed explanation will be omitted.

The communication interface 140 is a component for the electronic apparatus 100 to perform communication with an external electronic apparatus (not shown) such as a server. The electronic apparatus 100 may receive various data such as information on a recognized object and information on a virtual object from an external electronic apparatus (not shown) through the communication interface 140.

Also, the communication interface 140 may include various communication modules such as a wired communication module (not shown), a near field wireless communication module (not shown), and a wireless communication module (not shown).

Here, a wired communication module is a module for performing communication with an external apparatus (not shown) according to a wired communication method such as a wired Ethernet. A near field wireless communication module is a module for performing communication with an external apparatus (not shown) located in a close distance according to a near field wireless communication method such as Bluetooth (BT), Bluetooth Low Energy (BLE), and ZigBee methods. In addition, a wireless communication module is a module that is connected to an external network according to a wireless communication protocol such as Wireless Fidelity (Wi-Fi) and Institute of Electrical and Electronics Engineers (IEEE) and performs communication with an external apparatus (not shown) and a voice recognition server (not shown). Other than the above, a wireless communication module may further include a mobile communication module that is connected with a mobile communication network and performs communication according to various mobile communication standards such as 3rd Generation (3G), 3rd Generation Partnership Project (3GPP), Long Term Evolution (LTE), LTE Advanced (LTE-A), and fifth generation (5G) Networks.

The memory 150 is a component for storing various kinds of programs and data for the operation of the electronic apparatus 100. The memory 150 may be implemented as a non-volatile memory, a volatile memory, a flash-memory, a hard disk drive (HDD), or a solid state drive (SDD), etc. Also, the memory 150 may be accessed by the processor 130, and reading/recording/correction/deletion/update, etc. of data by the processor 130 may be performed. In the disclosure, the term memory may include the memory 150, a read-only memory (ROM) (not shown) and a random access memory (RAM) (not shown) inside the processor 130, or a memory card (not shown) mounted on the electronic apparatus 100 (e.g., a micro SD card, a memory stick).

The memory 150 may store information on various virtual objects of the electronic apparatus 100. Also, according to an embodiment, the electronic apparatus 100 may store information on an electronic apparatus which the camera 110 photographed and can be recognized as an object.

The input interface 160 may receive a user input for controlling the electronic apparatus 100. In particular, the input interface 160 may receive input of voice information of a user for a reproduced content, or receive input of a user input selecting a GUI displayed on a display. In the input interface 160, as illustrated in FIG. 13, a microphone 161 for receiving input of a user voice, a touch panel 162 for receiving input of a user touch using a user's hand or a stylus pen, etc., a button 163 for receiving input of a user manipulation, etc. may be included. However, the example of the input interface 160 illustrated in FIG. 13 is merely an example, and the input interface 160 may be implemented as another input apparatus (e.g., a keyboard, a mouse, a motion inputter, etc.).

The speaker 170 is a component outputting various kinds of notification sounds or voice messages as well as various types of audio data for which various processing operations such as decoding or amplification, noise filtering, etc. were performed by an audio processor. In particular, the speaker 170 may output a response for voice information of a user as a voice message in the form of a natural language. A component for outputting audio may be implemented as a speaker, but this is merely an example, and such a component may be implemented as an output terminal that can output audio data.

The electronic apparatus 100 might not necessarily include all of the aforementioned components, and some components may be omitted.

Computer instructions for performing the processing operations of the electronic apparatus 100 according to the aforementioned various embodiments of the disclosure may be stored in a non-transitory computer-readable medium. Computer instructions stored in such a non-transitory computer-readable medium may implement the processing operations of the electronic apparatus 100 according to the aforementioned various embodiments of the disclosure performed by the aforementioned specific machine when they are executed by a processor of the specific machine.

A non-transitory computer-readable medium refers to a medium that stores data semi-permanently, and is readable by machines. Specifically, the aforementioned various applications or programs may be provided while being stored in a non-transitory computer-readable medium such as a CD, a DVD, a hard disk, a Blu-ray disk, a USB, a memory card, a ROM and the like.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. In addition, it is intended that such modifications are not to be interpreted independently from the technical idea or prospect of the disclosure.

What is claimed is:

1. An electronic apparatus comprising:
   a display;
   a memory configured to store instructions; and
   a processor configured to execute the instructions to:
   control a display to display an image captured via a camera, and a first guideline,
   identify a position of an area where an object is located in the image and a size of the area corresponding to a size of the object based on the first guideline,
   render a virtual object to replace the object,
   generate an augmented reality image including the virtual object that is located in the area, and
   control the display to display the augmented reality image.

2. The electronic apparatus of claim 1, wherein the processor is further configured to:
   based on an event, render the virtual object to indicate a movement of the virtual object.

3. The electronic apparatus of claim 1, wherein the processor is further configured to:
   identify a length of a blank space existing in an adjacent area of the object,
   identify whether the virtual object is capable of being located in the area where the object is located based on length information of the object and the length of the blank space, and
   based on the virtual object being capable of being located in the area where the object is located, render the virtual object.

4. The electronic apparatus of claim 1, wherein the processor is further configured to:
   identify whether the virtual object is capable of covering an object area of the object in the image, and
   generate the augmented reality image by replacing a partial object area of the object that is not covered by the virtual object with a background area adjacent to the partial object area.

5. The electronic apparatus of claim 1, wherein the processor is further configured to:
   control the display to display a plurality of virtual objects that are capable of replacing the object, and
   based on a user input selecting one of the plurality of virtual objects being received, render the virtual object corresponding to the user input.

6. The electronic apparatus of claim 1, wherein the processor is further configured to:
   based on a line being input in association with a surface of the object in the image, determine a location of the virtual object in the augmented reality image based on the input line.

7. The electronic apparatus of claim 1, wherein the processor is further configured to:
   identify a location of the virtual object in the augmented reality image based on location information and angle information of the camera, and
   generate the augmented reality image by arranging the virtual object in the location.

8. The electronic apparatus of claim 1, wherein the processor is further configured to:
   generate a second guideline for guiding a capturing angle of the camera, and
   change a length of the second guideline according to the capturing angle of the camera.

9. The electronic apparatus of claim 1, wherein the processor is further configured to:
   based on receiving a user input that moves the virtual object included in the augmented reality image, change a location of the virtual object based on the user input and render the virtual object according to the changed location.

10. The electronic apparatus of claim 1, wherein the processor is further configured to:
    based on location information or angle information of the camera being changed while the augmented reality image is displayed, change the virtual object based on the location information or angle information of the camera.

11. A control method of an electronic apparatus, the method comprising:
    capturing an image;
    displaying a first guideline and the image;
    identifying a position of an area where an object is located in the image and a size of the area corresponding to a size of the object based on the first guideline;
    rendering a virtual object to replace the object;
    generating an augmented reality image including the virtual object that is located in the area; and
    displaying the augmented reality image.

12. The control method of claim 11, further comprising:
    based on an event, rendering the virtual object to indicate a movement of the virtual object.

13. The control method of claim 11, wherein the rendering a virtual object comprises:
    identifying a length of a blank space existing in an adjacent area of the object;

identifying whether the virtual object is capable of being located in the area where the object is located based on length information of the object and the length of the blank space; and based on the virtual object being capable of being located in the area where the object is located, rendering the virtual object.

14. The control method of claim 11, wherein the generating an augmented reality image comprises:

identifying whether the virtual object is capable of covering an object area of the object in the image; and generating the augmented reality image by replacing a partial object area of the object that is not covered by the virtual object with a background area adjacent to the partial object area.

15. The control method of claim 11, further comprising: displaying a plurality of virtual objects that are capable of replacing the object; and based on a user input selecting one of the plurality of virtual objects being received, rendering the virtual object corresponding to the user input.

16. The control method of claim 11, further comprising: based on a line being input in association with a surface of the object in the image, determining a location of the virtual object in the augmented reality image based on the input line.

17. The control method of claim 11, further comprising: identifying a location of the virtual object in the augmented reality image based on location information and angle information of a camera; and generating the augmented reality image by arranging the virtual object in the location.

18. The control method of claim 11, further comprising: generating a second guideline for guiding a capturing angle of a camera; and changing a length of the second guideline according to the capturing angle of the camera.

19. The control method of claim 11, further comprising: receiving a user input that moves the virtual object included in the augmented reality image; and changing a location of the virtual object based on the user input and rendering the virtual object according to the changed location.

20. A non-transitory computer-readable medium configured to store instructions that, when executed by a processor of an apparatus, cause the processor to:

control a display of the apparatus to display an image captured via a camera of the apparatus;

control the display to display a first guideline in the image;

identify a position of an area where an object is located in the image and a size of the area corresponding to a size of the object based on the first guideline;

render a virtual object to replace the object;

generate an augmented reality image including the virtual object that is located in the area; and control the display to display the augmented reality image.

* * * * *